US008170293B2

(12) United States Patent
Tosa et al.

(10) Patent No.: US 8,170,293 B2
(45) Date of Patent: May 1, 2012

(54) MULTIMODAL OCULAR BIOMETRIC SYSTEM AND METHODS

(75) Inventors: Yasunari Tosa, Arlington, MA (US); David Usher, Waltham, MA (US); Nichoas A. Accomando, Hingham, MA (US); Vladimir Ruzhitsky, Newton, MA (US); Faisal Bashir, Woburn, MA (US)

(73) Assignee: Identix Incorporated, Bloomington, MN (US)

( * ) Notice: Subject to any disclaimer, the term of this patent is extended or adjusted under 35 U.S.C. 154(b) by 1194 days.

(21) Appl. No.: 11/898,190

(22) Filed: Sep. 10, 2007

(65) Prior Publication Data

US 2008/0253622 A1   Oct. 16, 2008

Related U.S. Application Data

(60) Provisional application No. 60/844,659, filed on Sep. 15, 2006.

(51) Int. Cl.
*G06K 9/00* (2006.01)
*G06K 9/62* (2006.01)

(52) U.S. Cl. ........ 382/117; 382/115; 382/116; 382/118; 382/209

(58) Field of Classification Search .................. 382/115, 382/116, 118, 209
See application file for complete search history.

(56) References Cited

U.S. PATENT DOCUMENTS

| | | |
|---|---|---|
| 3,069,654 A | 12/1962 | Hough |
| 4,641,349 A | 2/1987 | Flom et al. |
| 5,291,560 A | 3/1994 | Daugman |
| 5,563,962 A | 10/1996 | Peters et al. |
| 5,572,596 A | 11/1996 | Wildes et al. |
| 5,751,836 A | 5/1998 | Wildes et al. |
| 5,790,235 A | 8/1998 | Kirschbaum |
| 5,859,686 A | 1/1999 | Aboutalib et al. |
| 5,953,440 A | 9/1999 | Zhang et al. |
| 5,999,653 A | 12/1999 | Rucklidge et al. |
| 6,144,754 A | 11/2000 | Okano et al. |
| 6,152,563 A | 11/2000 | Hutchinson et al. |
| 6,215,891 B1 | 4/2001 | Suzaki et al. |

(Continued)

FOREIGN PATENT DOCUMENTS

WO   2006/047002 A1   5/2006

OTHER PUBLICATIONS

Yuan, W. et al., "A Rapid Iris Location Method Based on the Structure of Human Eyes", Proceedings of the 2005 IEEE Engineering in Medicine and Biology 27th Annual Conference, Shanghai, China, Sep. 1-4, 2005.*

(Continued)

*Primary Examiner* — Anand Bhatnagar
*Assistant Examiner* — Soo Park
(74) *Attorney, Agent, or Firm* — Nixon Peabody LLP

(57) ABSTRACT

Biometric systems capture and combine biometric information from more than one modality, employing digital processing algorithms to process and evaluate captured images having data for a biometric characteristic. Such digital algorithms may include a pupil segmentation algorithm for determining a pupil image in the captured image, an iris segmentation algorithm for determining an iris image in the captured image, an eyelid/eyelash segmentation algorithm for determining an eyelid/eyelash image in the captured image, and an algorithm for measuring the focus on the iris. Some embodiments employ an auto-capture process which employs such algorithms, in part, to evaluate captured images and obtain the best possible images for biometric identification.

14 Claims, 24 Drawing Sheets

U.S. PATENT DOCUMENTS

| | | | |
|---|---|---|---|
| 6,229,907 B1 | 5/2001 | Okano et al. | |
| 6,247,813 B1 | 6/2001 | Kim et al. | |
| 6,285,780 B1 | 9/2001 | Yamakita et al. | |
| 6,373,968 B2 | 4/2002 | Okano et al. | |
| 6,526,160 B1 | 2/2003 | Ito | |
| 6,532,298 B1 | 3/2003 | Cambier et al. | |
| 6,542,624 B1 | 4/2003 | Oda | |
| 6,546,121 B1 | 4/2003 | Oda | |
| 6,571,002 B1 | 5/2003 | Ogawa | |
| 6,591,064 B2 | 7/2003 | Higashiyama et al. | |
| 6,597,377 B1 | 7/2003 | MacPhail | |
| 6,614,919 B1 | 9/2003 | Suzaki et al. | |
| 6,700,998 B1 | 3/2004 | Murata | |
| 6,714,665 B1 | 3/2004 | Hanna et al. | |
| 6,753,919 B1 | 6/2004 | Daugman | |
| 6,760,467 B1 | 7/2004 | Min et al. | |
| 6,785,406 B1 | 8/2004 | Kamada | |
| 6,850,631 B1 | 2/2005 | Oda et al. | |
| 6,944,318 B1 | 9/2005 | Takata et al. | |
| 6,965,634 B1 | 11/2005 | Clark | |
| 6,992,717 B2 | 1/2006 | Hatano | |
| 7,099,495 B2 | 8/2006 | Kodno et al. | |
| 7,155,035 B2 | 12/2006 | Kondo et al. | |
| 7,197,166 B2 | 3/2007 | Jeng | |
| 7,277,561 B2 | 10/2007 | Shin | |
| 7,711,152 B1* | 5/2010 | Davida et al. | 382/115 |
| 2003/0012413 A1 | 1/2003 | Kusakari et al. | |
| 2004/0197011 A1 | 10/2004 | Camus et al. | |
| 2005/0008201 A1* | 1/2005 | Lee et al. | 382/117 |
| 2006/0008124 A1 | 1/2006 | Ewe et al. | |
| 2006/0147094 A1* | 7/2006 | Yoo | 382/117 |
| 2006/0147095 A1 | 7/2006 | Usher et al. | |
| 2006/0165266 A1 | 7/2006 | Hamza | |
| 2007/0036397 A1* | 2/2007 | Hamza | 382/117 |
| 2007/0047772 A1 | 3/2007 | Matey et al. | |
| 2007/0047773 A1 | 3/2007 | Martin et al. | |
| 2007/0110284 A1 | 5/2007 | Rieul et al. | |
| 2007/0160266 A1 | 7/2007 | Jones et al. | |
| 2007/0160267 A1 | 7/2007 | Jones et al. | |

OTHER PUBLICATIONS

Rossant, F. et al., "Iris Identification and Robustness Evaluation of a Wavelet Packets Based Algorithm", Image Processing, 2005. ICIP 2005.IEEE International Conference on, vol. 3, No. pp. III-257-III-60, Sep. 11-14, 2005.*

Y. Park, et al.; "A Fast Circular Edge Detector for the Iris Region Segmentation"; S.-W. Lee, H.H. Buelthoff, T. Poggio (Eds.) BMCV 2000, LNCS 1811, pp. 417-423, 2000.

Christel-Loic Tisse, et al.; "Person identification technique using human iris recognition"; Advanced System Technology; Universite de Montpellier.

Libor Masek; "Recognition of Human Iris Patterns for Biometric Identification"; School of Computer Science and Software Engineering, The University of Western Australia, 2003, pp. 1-56.

Xiaomei Liu, et al.; "Experiments with An Improved Iris Segmentation Algorithm"; Department of Computer Science and Engineering University of Notre Dame; Fourth IEEE Workshop on Automatic Identification Advanced Technologies (AutoID), Oct. 2005, New York, 6 pages.

Ping-Sung Liao, et al.; "A Fast Algorithm for Multilevel Thresholding"; Journal of Information Science and Engineering 17, pp. 713-727 (2001).

Nobuyuki Otsu; "A Threshold Selection Method from Gray-Level Histograms"; IEEE Transactions on Systems Man and Cybernetics, vol. SMC-9, No. I, Jan. 1979.

Morimoto et al., "Automated Iris Segmentation Using Active Near Infra Red Lighting", 2005, p. 1-7, [retrieved on Jul. 18, 2008], Retrieved from <URL: http://sibgrapi.sid.inpe.br/col/sid.inpe.br/banon/2005/07.18.05.33/doc/morimotoc_iris.pdf>.

Citation for Morimoto et al. [online], p. 1-7, [retrieved on Jul. 18, 2008], Retrieved from the Internet: <URL: http://sibgrapi.sid.inpe.br/col/sid.inpe.br/banon/2001/03.30.15.38.24/doc/mirror.cgi>.

Vyas et al., "Automated Texture Analysis with Gabor Filter", GVIP Journal [online], vol. 6, Issue 1, Jul. 2006, p. 35-41, [Retrieved from the Internet: <URL: http://www.icgst.com/gvip/Volume6/Issue1/P1150614003.pdf>.

Int'l Search Report for PCT/US07/78062 which claims priority to U.S. Appl. No. 60/844,659 (Jul. 25, 2008).

Written Opinion for PCT/US07/78062 which claims priority to U.S. Appl. No. 60/844,659 (Jul. 25, 2008).

* cited by examiner

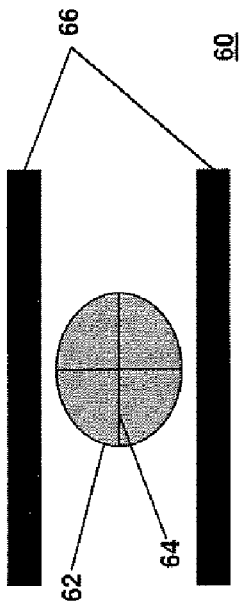
FIG. 7
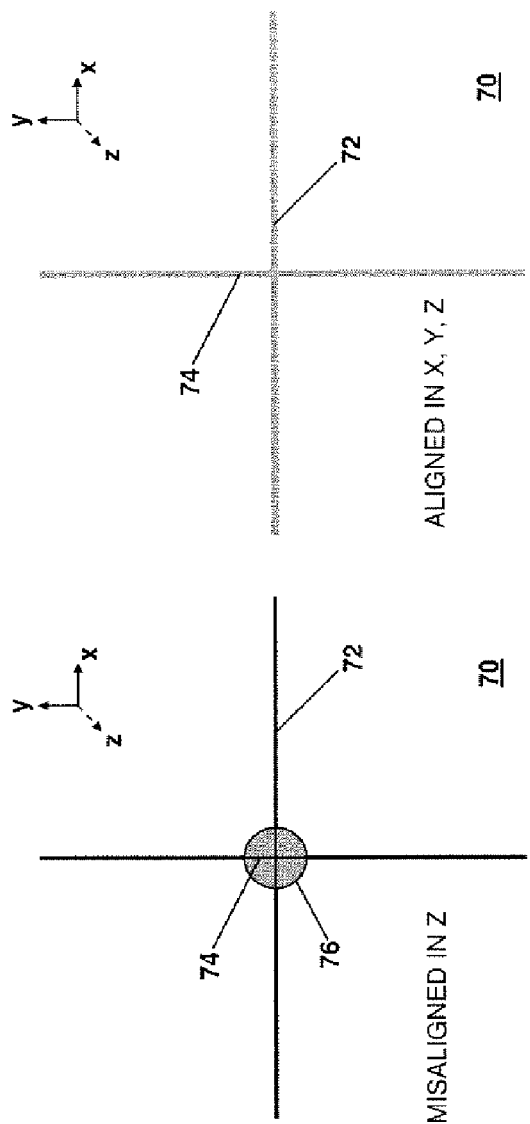
FIG. 8C ALIGNED IN X, Y, Z
FIG. 8B MISALIGNED IN Z
FIG. 8A MISALIGNED IN X, Y, Z

FIGS. 15A-D

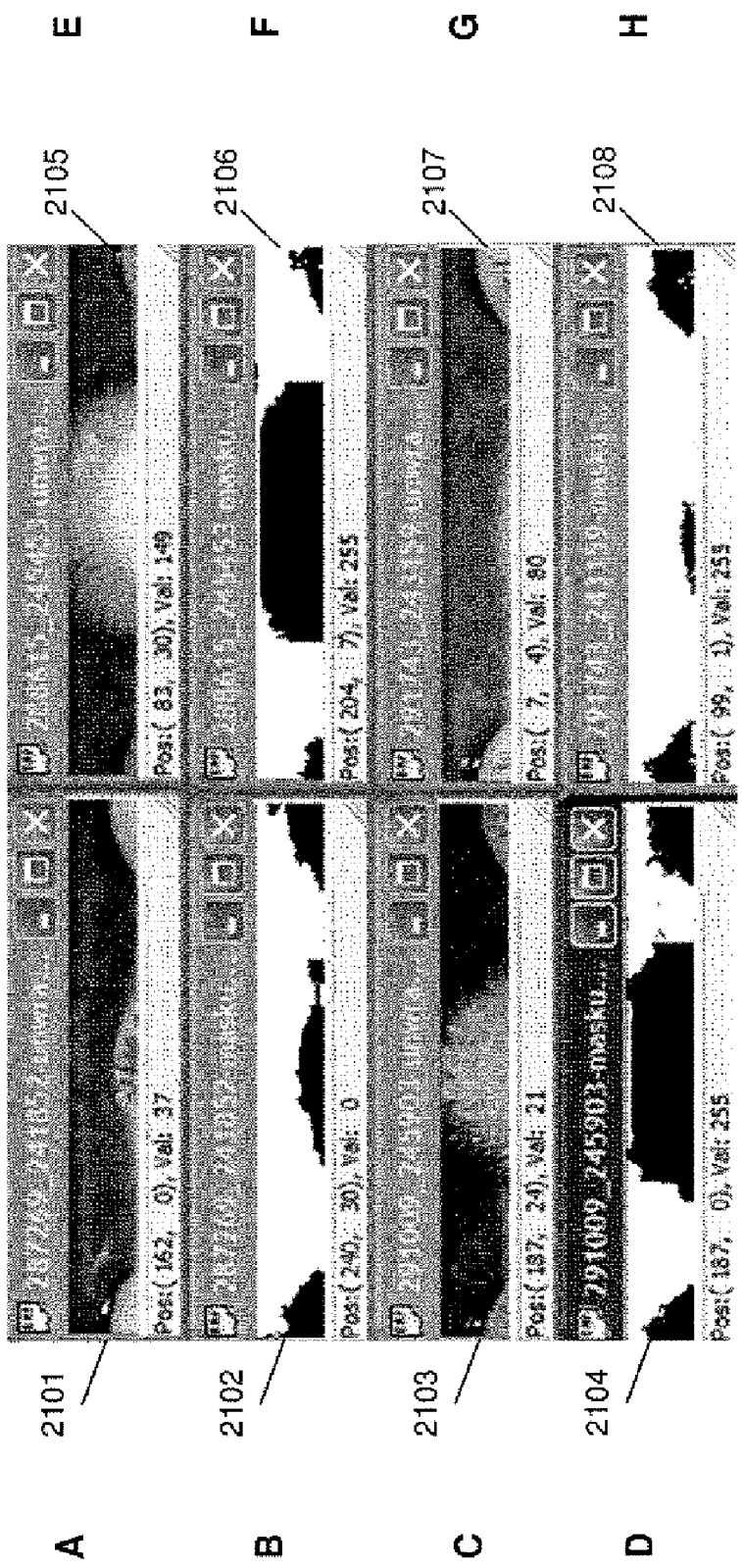
FIG. 19A-H

MULTIMODAL OCULAR BIOMETRIC SYSTEM AND METHODS

CROSS REFERENCE TO RELATED APPLICATIONS

This application claims priority to U.S. Provisional Application No. 60/844,659 filed Sep. 15, 2006, the contents of which are incorporated entirely herein by reference.

BACKGROUND OF INVENTION

1. Field of Invention

The present invention relates generally to instruments for biometric identification, and more particularly, to a multimodal ocular imaging system used for biometric identification and methods for processing image data captured by the multimodal ocular imaging system.

2. Description of the Related Art

Due to the unique character of each individual's retina or iris, various systems attempt to use either the retina or the iris for biometric identification. Commercially available ocular imaging systems used for biometric identification generally use a single biometric modality. These imaging systems process images of the iris or the retina from only one of two eyes of a subject. None of these conventional systems processes images of both the iris and the retina in combination. Moreover, these systems do not process images from the iris and/or the retina from both eyes.

Conventional single-eye iris imaging systems suffer from several disadvantages. In particular, such systems may suffer from frequent failure to acquire an image, i.e. a high fail-to-acquire (FTA). The effectiveness of these iris imaging systems is often limited by occlusions caused by eyelids and eyelashes, lighting issues (controlled or uncontrolled), focus problems, pupil size variation (between different persons or with the same person), non-linear iris fiber distortion caused by expansion or contraction of the pupil, and rotation and skew of the head or eye. Such systems are also susceptible to spoofing. Moreover, auto focus functions of conventional iris-only systems are affected by scratches in eyeglasses or the reflections from eyeglasses. In fact, ANSI standards require enrollment to be without eyeglasses. Additionally, contact lenses can cause iris outer boundary segmentation problems. Moreover, colored contact lenses can result in spoofing.

Conventional single-eye retina imaging systems also have several disadvantages. For instance, problems with such retina imaging systems occur when visible light used for illumination blinds or distracts the user, when the user is not properly aligned with the image capture device, or when poor areas of the retina are chosen for imaging. Moreover, conventional retina-only systems are also negatively affected by focus problems as well as rotation and skew of the head or eye.

In addition, as a further disadvantage, the conventional imaging systems above process captured image data according to exhaustive edge detection, computationally expensive circle finding techniques, and other algorithms that are less appropriate for real time use and use on conventional processing devices.

While the iris systems described previously only process an iris image from only one of two eyes, there are other existing devices that acquire iris images from both eyes. However, such systems suffer from significant disadvantages. For example, these existing devices require a subject to walk up to a substantially stationary and device and look at a half mirror to position his eyes properly for image capture. Disadvantageously, this approach requires the subject to position himself so that his eyes are at the "right" height for image capture, or alternatively, the acquisition device must repositioned to accommodate the height of the subject, which may vary from 4 feet to 7 feet.

SUMMARY OF THE INVENTION

Considering the disadvantages of the single modal systems described previously, a need has been identified for a multimodal ocular biometric system that addresses these disadvantages by capturing and combining biometric information from more than one modality. In particular, embodiments of the present invention provide a multimodal ocular biometric system that captures and processes images of both the iris and the retina, from which data can be determined for biometric identification.

Further embodiments provide a multimodal ocular system that captures and processes images of the iris and/or the retina from both eyes of a subject. For example, one embodiment may provide a dual-iris multimodal ocular system that processes images of the iris from both eyes of a subject. In contrast to some devices described previously, embodiments of the present invention may have a size and shape that is convenient for operation of the embodiments. Particular embodiments may have binocular-like shape that permits a user, regardless of height, to bring the device to the user's face and correctly correct position the user's eyes for image capture.

Embodiments of the present invention employ algorithms to control the capture of biometric information from more than one modality and to process the captured images. For example, the dual-iris embodiments described immediately above may employ digital processing algorithms to process and evaluate iris image data. Such digital algorithms may include a pupil segmentation algorithm for determining a pupil image in the captured image, an iris segmentation algorithm for determining an iris image in the captured image, an eyelid/eyelash segmentation algorithm for determining an eyelid/eyelash image in the captured image, and an algorithm for measuring the focus on the iris. Some embodiments employ an auto-capture process which employs such algorithms, in part, to evaluate captured images and obtain the best possible images for biometric identification. The digital algorithms may be implemented on a processing device, which executes programmed instructions corresponding to the digital algorithms.

In one embodiment, pupil segmentation and iris segmentation are achieved through a sparse point method (SPM) algorithm. In another embodiment, the eyelid/eyelash segmentation employs iris intensity modeling from regions free of eyelid/eyelash occlusion as a basis for determining whether other regions of an eye image correspond to eyelid/eyelash occlusion. In yet another embodiment, the eyelid/eyelash segmentation algorithm employs iris texture analysis using a bank of log-Gabor filters to generate a texture representation based on the phase congruency feature-space. In a further embodiment, an algorithm for measuring the focus on the iris employs a gradient technique across the iris/pupil boundary. In yet a further embodiment, an iris focus measurement employs the lighting reflection from image capture.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE FIGURES

FIG. 7 illustrates an exemplary fixation scheme as seen by the user.

FIG. 8A illustrates another exemplary fixation scheme, as seen by the user when the user is misaligned along the X-, Y-, and Z-axes.

FIG. 8B illustrates another exemplary fixation scheme, as seen by the user, when the user is misaligned along the Z-axis.

FIG. 8C illustrates another exemplary fixation scheme, as seen by the user when the user is aligned along the X-, Y-, and Z-axes.

FIG. 19A illustrates an unwrapped iris images for application of an exemplary digital processing algorithm for eyelid/eyelash segmentation.

FIG. 19B illustrates the mask corresponding to the unwrapped iris image of 19A after application of an exemplary digital processing algorithm for eyelid/eyelash segmentation.

FIG. 19C illustrates an unwrapped iris images for application of an exemplary digital processing algorithm for eyelid/eyelash segmentation.

FIG. 19D illustrates the mask corresponding to the unwrapped iris image of 19C after application of an exemplary digital processing algorithm for eyelid/eyelash segmentation.

FIG. 19E illustrates an unwrapped iris images for application of an exemplary digital processing algorithm for eyelid/eyelash segmentation.

FIG. 19F illustrates the mask corresponding to the unwrapped iris image of 19E after application of an exemplary digital processing algorithm for eyelid/eyelash segmentation.

FIG. 19G illustrates an unwrapped iris images for application of an exemplary digital processing algorithm for eyelid/eyelash segmentation.

FIG. 19H illustrates the mask corresponding to the unwrapped iris image of 19G after application of an exemplary digital processing algorithm for eyelid/eyelash segmentation.

DETAILED DESCRIPTION

Embodiments of the present invention provide a multimodal ocular biometric system that captures and processes images of both the iris and the retina, from which data can be determined for biometric identification. Further embodiments provide a multimodal ocular system that captures and processes images of the iris and/or the retina from both eyes of a subject. Biometrics based on data provided by these embodiments are more accurate and robust than using biometrics that include data from only the iris or only the retina from a single eye.

Advantageously, the iris and retina present biometric features that are both independent and strongly coupled. They are independent in that they are extracted from different biological structures. On the other hand, the iris and retina biometric features are strongly coupled because there is a fixed geometric relationship between the iris and the retina. Specifically, the position and orientation of the eye is reflected simultaneously in both the iris and the retina. Further, the biometric features of the iris and the retina are on the same scale. The strong coupling between the biometric features of the iris and the retina not only facilitates the simultaneous capture of these biometric features, but allows these features to be cross-referenced or combined in a common feature space that preserves the geometric relationship between the iris and retina. In addition, the use of an iris system complements the use of a retina system. For instance, small pupils are generally an advantage for iris systems while large pupils are generally an advantage for retina systems.

Figure 1:
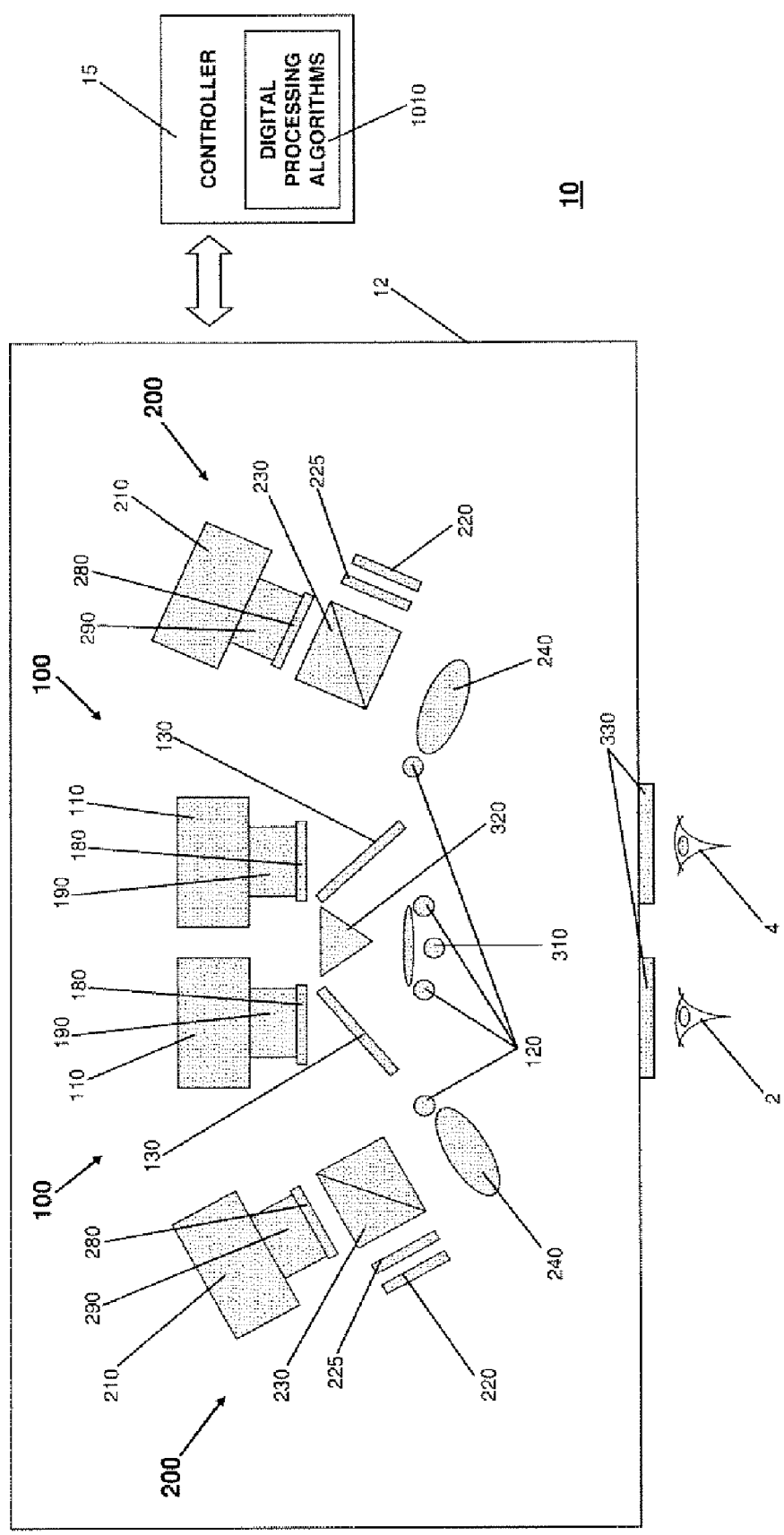
FIG. 1 illustrates an embodiment of the present invention with a quadruple-sensor, two-eye simultaneous configuration.

Accordingly, embodiments of the present invention employ various configurations of at least one imaging system that captures iris images and retina images. For example, FIG. 1 illustrates a two-eye simultaneous iris/retina combination system, which employs two iris imaging systems that respectively capture iris images of the right and left eyes, and two retinal imaging systems that respectively capture the images of the right and left retina, all simultaneously, or at least substantially simultaneously. Information from the imaging systems is used to accomplish retinal pattern recognition, iris pattern recognition, and biometric fusion. Moreover, the information from the individual imaging systems are used in combination to establish a host of attributes including, but not limited to, positioning, tracking, focus, and interpupillary distance. In addition, the multimodal ocular biometric system is especially well suited for image capture of both eyes when the user is not wearing corrective eyewear. Although many of the features of the present invention may be described with respect to the two-eye simultaneous iris/retina combination system shown in FIG. 1, other configurations, as described further below, can implement these features in order to combine iris and retina images for biometric identification.

Advantageously, embodiments of the present invention may have a size and shape that is convenient for operation of the embodiments. As described further below, embodiments may have binocular-like shape that permits a user, regardless of height, to bring the device to the user's face and correctly position the user's eyes for image capture.

Referring to FIG. 1, the multimodal ocular biometric system 10 includes an optical system which is symmetric for both the left eye 2 and the right eye 4. The multimodal ocular biometric system 10 includes two camera sensors 110 to capture respective images of the iris in the right and left eyes. The system 10 also has two camera sensors 210 to capture respective images of the retina in the right and left eyes. As such, an iris imaging system 100 and a retina imaging system 200 are provided for each eye. Therefore, iris and retina images can be captured simultaneously, or at least substantially simultaneously. Preferably, the iris imaging systems 100 and the retina imaging system 200 are housed in a single image capture device 12, as depicted in FIG. 1.

The biometric information collected from the system 10 includes iris patterns and retina patterns, from which biometric data can be extracted. Liveness detection, which detects whether the biometric information comes from a living source, may also be achieved with the system 10. U.S. patent application Ser. No. 11/258,749, filed on Oct. 26, 2005, describes a Method and System for Detecting Biometric Liveness, and is entirely incorporated herein by reference.

Furthermore, as described in more detail below, by capturing images of both irises simultaneously, the system 10 is able to provide biometrics, such as interpupillary distance and limbus diameter for both the right and left eyes. Advantageously, measurements of the interpupillary distance and limbus diameter can be used to improve database searching during biometric identification, because they allow reference data to be binned and narrowed to a relevant subset of data before a search is conducted for matches based on iris codes or retinal codes. In this way, a comprehensive search of all reference data for biometric matching is not required. For instance, limbus diameters for the general population have a range of about 9.5 mm to 13.5 mm. Thus, if the system 10 measures a limbus diameter to be 10.5 mm, a subset of reference data covering individuals with limbus diameters in a range of 10.25-10.75 mm, rather than the entire database, may be searched. Compared to conducting a comprehensive search, the time to obtain a match with the reference data may improve by up to 8 times when narrowing the data down according to ranges of limbus diameter in this manner. Moreover, interpupillary distances for the general population have a range of ±10 mm. Obtaining a ±1 mm resolution would thus improve search times by up to a factor of 10. As a result, narrowing the search data according to limbus diameter and the interpupillary distance may improve search times by 80 (8×10), which may be significant for very large databases. Also, throughput can be enhanced by system memory caching based on bins for mid-sized databases in multi-machine systems. Considering N interpupillary distance bins, if N machines with N local system memories each have enough system memory to hold the entire bin for an interpupillary distance in the database, then database access is less likely to become a system bottleneck.

To capture the iris and retina images, the multimodal ocular biometric system 10 employs both iris illumination adapted to emit photons to the iris of an eye and retina illumination adapted to emit photons to the retina of the eye. In particular, the embodiment shown in FIG. 1 employs LEDs (light emitting diodes) 120 and 220 to produce iris illumination and retina illumination, respectively. FIG. 1 also shows that the iris and retina illumination uses separate LED's. Correspondingly, the camera sensors 110 are configured to capture iris images when the right and left irises reflect the emitted light from the illumination source 120, and the camera sensors 210 are configured to capture retina images when the right and left retinas reflect the emitted light from the illumination source 220.

Alternatively, other embodiments of the present invention may employ laser diodes rather than LEDs. In these alternative embodiments, the system can perform laser Doppler imaging using an addressable CMOS detector on specific regions of interest. Advantageously, this approach permits retinal liveness testing as well as retina vessel determination and contrast enhancement.

As depicted in FIG. 1, a controller 15 is operably connected to the iris illumination and the retina illumination, such as LED's 120 and 220. The controller 15 manages the manner in which the iris illumination and the retina illumination emits photons to the irises or the retinas, respectively. As is known, the controller 15 may be a programmable processing device that executes software, or stored instructions. For example, the controller 15 may employ an external conventional computer networked with the image capture device 12. Alternatively, a field programmable gate array (FPGA) or digital signal processor (DSP) may be employed on board the image capture device 12. In general, the systems described herein may employ a controller, as well as other processors, that are either internal or external to the image capture devices, which house the illumination and sensor systems.

The wavelengths for illumination of the iris and retina may be in the near infrared (NIR) (700 nm to 1000 nm). Special filters or coated optics may be used in the optical train to select specific wavelengths to satisfy the 700 nm to 900 nm wavelength requirements for the ANSI specification for Iris Image Interchange Format (ANSI INCITS 379-2004), but still allow a visible color image.

Accordingly, in the exemplary embodiment illustrated in FIG. 1, the iris illumination system of the present invention may operate to illuminate just the inner orbit of the eye. Preferably, the area of interest outside the field of view (FOV) of the iris camera 110 is not over-illuminated, as illumination outside the FOV can cause reflections off the cheek, forehead, or nose creating non-uniform illumination of the iris. This is especially the case for people who wear makeup containing $TiO_2$. Moreover, illuminating the area outside the FOV of the camera is a waste of light and energy. Two arrays of LEDs 120 at a wavelength of 850 nm, for example, are masked and focused on the iris and sclera in order to create this uniform illumination. The illumination occurs at an angle of approximately ±15 degrees measured from the line of sight of the user in order to minimize retro-reflection off the retina with the associated bright pupil corresponding to the iris image. The pupil must remain dark for image analysis and to meet ANSI INCITS specification.

Light reflecting off the iris passes through a broadband antireflection coated optical window 330 and is imaged back through the imaging system, through a dichroic beamsplitter 130. The light then passes through a plastic or glass longpass filter 180 with a cutoff wavelength of 780 nm, for example. The longpass filter 180 prevents ambient visible light from entering the imaging system and creating noise in the image. The light is then focused with the iris imaging lens 190 to the image sensor 110. In a particular embodiment, the sensor 110 is a CMOS (complementary metal-oxide semiconductor) detector with high sensitivity to NIR illumination. The CMOS detector may have square pixels, a wide angle format, and a global shutter.

In general, the iris imaging system may have a refractive lens (a single or a series of lenses) 190 which images the iris to a CMOS image sensor 110 or, alternatively, a CCD (charge-coupled device) sensor 110. The image capture device 12 may also employ reflective or a combination of refractive and reflection optics. The imaging sensor 110 may also have a global shutter or a rolling shutter.

Figure 10:
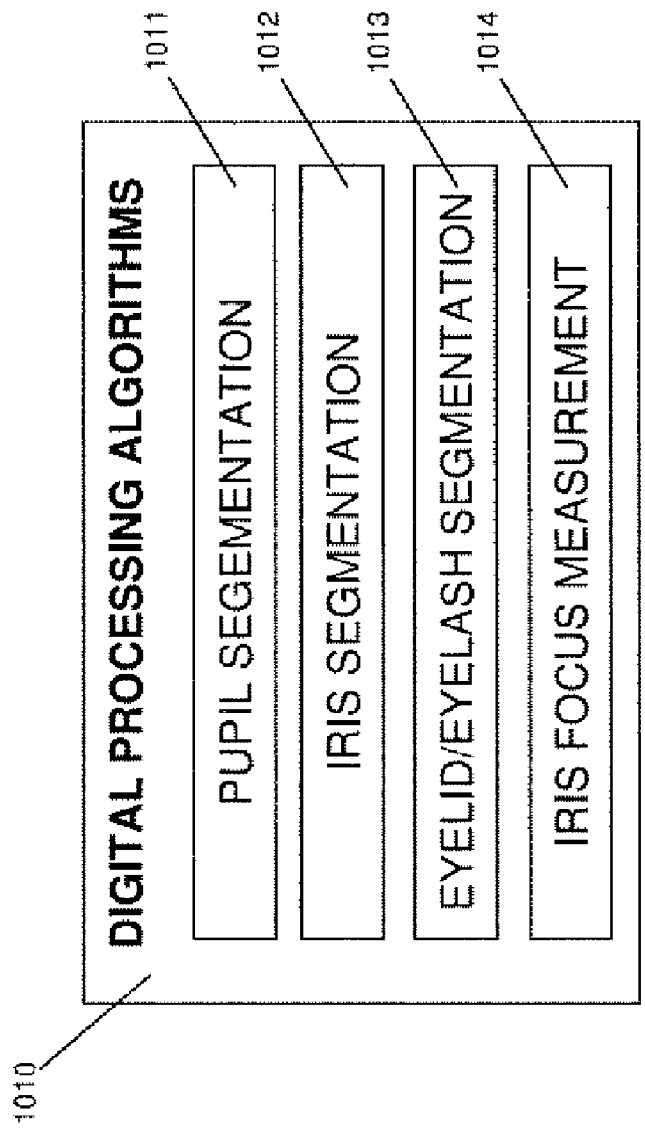
FIG. 10 illustrates digital processing algorithms that may be included in an embodiment of the present invention.

As illustrated in FIGS. 10-22, embodiments of the present invention may employ an iris imaging system that uses digital processing algorithms 1010 to process and evaluate iris image data, which is captured, for example, by the camera sensor 110 in the multimodal ocular biometric system 10. As shown in FIG. 10, the digital algorithms 1010 may include a pupil segmentation algorithm 1011 for determining a pupil image in the captured image, an iris segmentation algorithm 1012 for determining an iris image in the captured image, an eyelid/eyelash segmentation algorithm 1013 for determining an eyelid/eyelash image in the captured image, and an algorithm 1014 for measuring the focus on the iris. The digital algorithms 1010 may be implemented on a processing device, which executes programmed instructions corresponding to the digital algorithms 1010. For example, the controller 15, as shown in FIG. 1, may be responsible for executing instructions associated with the digital processing algorithms 1010. Alternatively, a separate processing device may be employed to execute the digital processing algorithms 1010, but a data communications link with the controller 15 may be required to enable the controller 15 to use data calculated by the digital processing algorithms 1010 as described further below.

Figure 11:
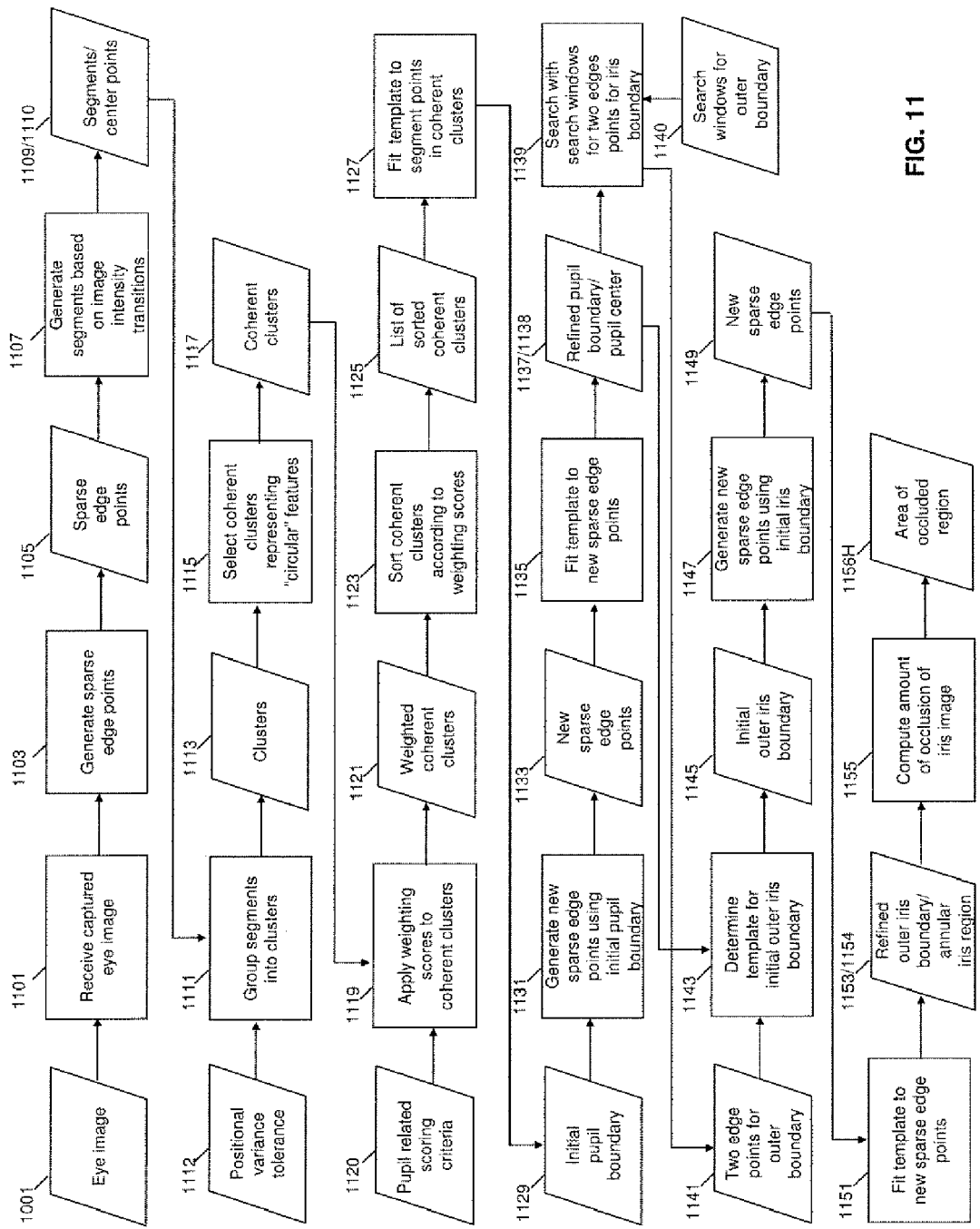
FIG. 11 illustrates an exemplary digital processing algorithm for pupil segmentation and iris segmentation which may be employed by embodiments of the present invention.
Figure 12:
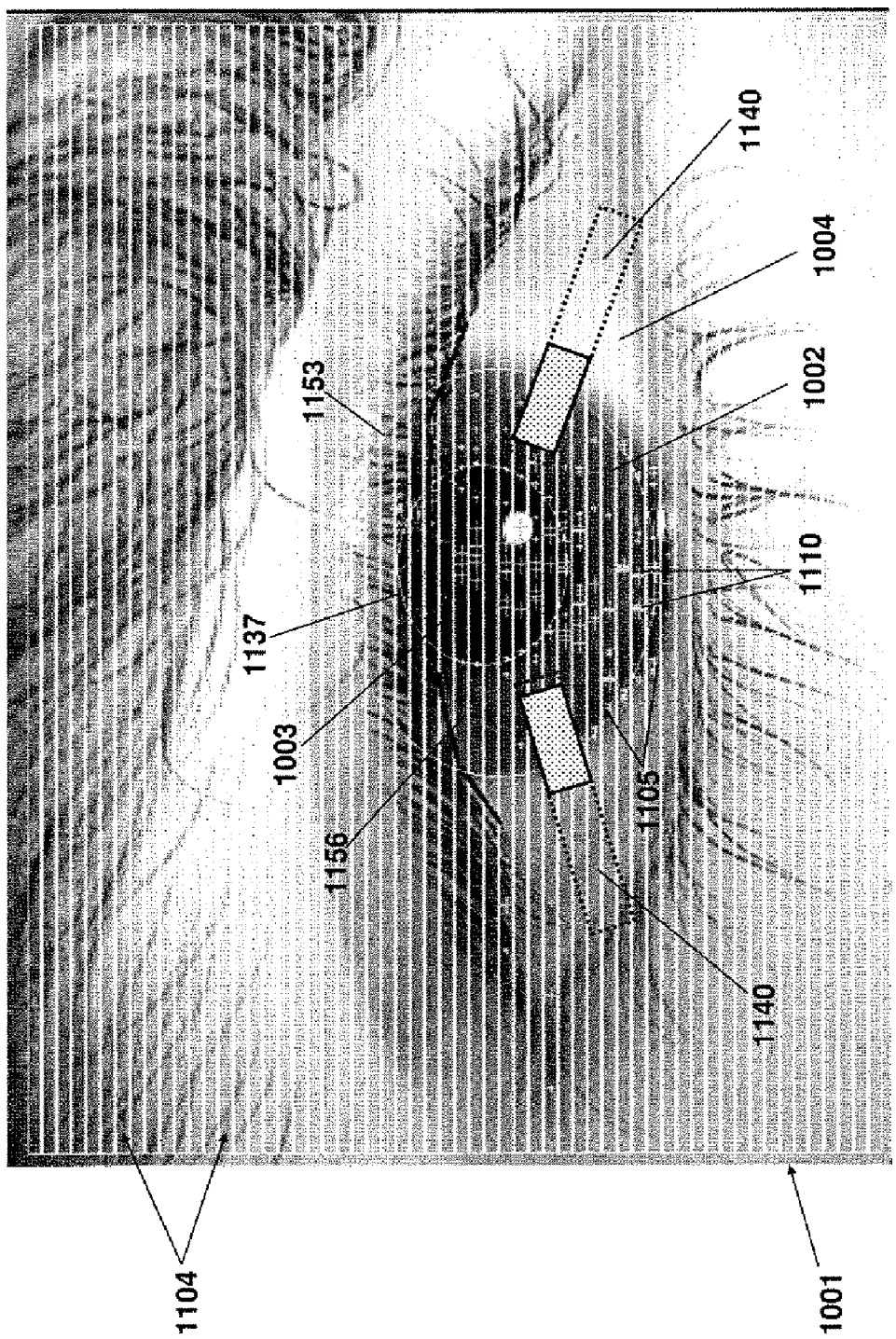
FIG. 12 illustrates aspects of applying the exemplary digital processing algorithm of FIG. 11 to a captured eye image.

FIG. 11 illustrates a digital processing algorithm known as sparse point method (SPM), which embodiments of the present invention may employ to segment a pupil image and an iris image from a captured eye image. FIG. 12 illustrates aspects of implementing SPM to a captured eye image 1001. As shown in FIG. 12, SPM models the iris image 1002 in a captured eye image 1001 as an annular region 1154 with an inner boundary 1137 and an outer boundary 1153. The inner boundary 1137 is defined by a darker pupil region 1003, while the outer boundary is defined by a lighter sclera region 1004. The inner boundary 1137 of the iris image corresponds with the pupil boundary, so segmentation of the pupil image 1003 is also a part of segmenting the iris image 1002.

In particular, SPM identifies sparse edge points in the captured eye image 1001 and determines how these sparse edge points relate to the inner boundary 1137 and the outer boundary 1153 of an iris image. In an intensity profile of the iris image 1002, both the inner boundary 1137 and the outer iris boundary 1153 may be characterized by a light-to-dark image intensity transition, i.e. edge, on one side and a dark-to-light image intensity transition on the other side. Accordingly, the sparse edge point detection uses image intensity profiles along a specified search direction in specially configured search windows. Peaks in the resulting gradient profile are then analyzed. If a determined peak is found to satisfy a confidence threshold, then according to the algorithm, an edge of a feature of interest has been detected. This technique of edge detection is sometimes referred to as a caliper. For given thresholds, the number of edges produced by each window depends on the content of the image in that particular window region. For example, when a caliper crosses a pupil, the results include the pupil edges. FIG. 12 shows a series of rectangular search windows 1104 that may be applied to an eye image 1001 as caliper test regions.

When sparse edge points corresponding with the iris image 1001 are identified, an ellipse fit method may be applied to the points to derive both the inner boundary, or pupil boundary, 1137 and the outer iris boundary 1153 for the iris annular region 1154. Of course, a circle may also be used to model the iris boundaries 1137 and 1153 using this technique, as a circle is merely an ellipse with identical semi-axes. Alternatively, because actual boundaries found are usually not a perfect circle or a perfect ellipse, a more general model template of the boundary, such as arc segments, may be employed to fit to the points found on the boundaries. Thus, although embodiments described herein may describe the use of an ellipse model, or more particularly a circle model, it is understood that that a more general template model may be used in place of the described models.

It is understood that pupil and iris radii may vary significantly from person-to-person, as well as image-to-image. Moreover, in addition to the fact that iris boundaries do not form perfect ellipses or circles, it is understood that iris locations may vary from image-to-image. However, this algorithm described herein is sufficiently robust and accurate to accommodate such variations.

Advantageously, the use of SPM is significantly faster than techniques that require exhaustive edge detection and computationally expensive circle finding techniques. As such, SPM provides a highly accurate real-time pupil and iris segmentation algorithm, which may be conveniently implemented, for example, on a conventional personal computer.

As illustrated in FIG. 11, in an initial step 1101, the digitally captured eye image 1001 made of pixels is received. Applying SPM, step 1103 identifies sparse edge points 1105 from caliper regions 1104 across the entire image 1001, as shown in FIG. 12, including sparse edge points corresponding to a pupil image 1003. From the sparse edge points 1105, step 1107 determines regions of interest (ROI), or segments, 1109 that are defined by a light-to-dark edge on the left and a dark-to-light edge on the right. The data for segments 1109 include center points 1110 for each of the segments 1109. FIG. 12 illustrates sparse edge points 1105 on the left and right sides of the pupil, as well as center points 1110 for the segments 1109.

In step 1111, the segments 1109 from step 1107 are grouped into clusters 1113 according to the position of their computed centers 1110 and a predetermined tolerance on positional variance 1112. Accordingly, each cluster 1113 represents an image feature that is symmetric with respect to a vertical line. Step 1111 produces any number of clusters 1113. Thus, step 1115 selects the clusters 1117, also known as coherent clusters, which correspond to a circular or circular-like feature. There may also be any number of these coherent clusters 1117. Therefore, in step 1119, the coherent clusters 1117 are weighted with scores based on how closely they meet criteria 1120 that distinguish the near-circular shape of the pupil from other circular or circular-like features in the image, such as the outer iris boundary. The scoring of step 1119 may account for a number of factors, such as intensities around edge points, the number of segments in a cluster, the average segment length, proximity of segment centers to image centers, or the like. Accordingly, step 1123 sorts the scored coherent clusters 1121 from step 1119. Starting from the top of the list 1125 of sorted coherent clusters, step 1127 then fits a circle to points that form the segments 1109 in each coherent cluster 1121. Step 1127 produces an initial boundary 1129 for the pupil image 1003.

Step 1131 searches along the initial pupil boundary 1129 to generate a larger number of new more accurately positioned sparse edge points 1133 corresponding to the pupil. The higher accuracy in step 1131 may be achieved by positioning rectangular search windows perpendicular to the initial pupil boundary. In step 1135, a circle is fitted to the new set of sparse edge points 1135 to generate a refined boundary 1137 for the pupil image 1003. The pupil boundary 1137 provides a basis for determining a position for the center 1138 of the pupil image 1003. Accordingly, the algorithm determines data for the pupil image 1003.

As described previously, the pupil boundary 1137 also corresponds with the inner boundary of the iris image 1002. With the inner boundary 1137 of the iris image 1002 now determined, FIG. 11 further illustrates step 1139 which searches for two edge points 1141 which estimate the outer boundary of the iris image 1002. This outer boundary is quasi-concentric with the iris inner boundary 1137. Step 1139 searches for a light-to-dark edge to the left of the pupil image 1003 and for the dark-to-light edge to the right of the pupil image 1003 by using a modified normalized correlation. The iris outer edges are somewhat symmetric with respect to the center 1138 of the pupil image 1003. Search windows 1140 employed by step 1139 may be long and narrow with longitudinal axes which originate from the pupil center and are angled downward from the horizontal by a predefined angle, e.g. 15 to 20 degrees, to avoid interference with other features, such as eyelashes, near the top of the eye image 1001. FIG. 12 illustrates two angular rectangular search windows 1140 for edge detection using modified normalized correlation.

Using two edge points 1141 found in step 1139 and the pupil center 1138, step 1143 determines a circle corresponding to an initial outer boundary 1145 of the iris image 1002 with a center which coincides with that of the pupil image 1003. Similar to steps 1131 and 1135 which refine the initial pupil image boundary 1129, steps 1147 and 1151 refine the initial outer iris boundary 1145. In particular, step 1147 generates a larger number of new sparse edge points 1149 by searching along the initial outer iris boundary 1145, and step 1151 fits a circle to the new set of sparse edge points 1149 to obtain a refined outer iris boundary 1153. Accordingly, an annular region 1154 in the eye image representing the iris image is defined by the refined outer pupil boundary, or inner iris boundary, 1137 and the refined outer iris boundary 1153.

The accuracy of the iris segmentation technique just described may be enhanced by intermediate verification steps. For example, the technique may check for the presence of an iris image surrounding a candidate pupil cluster before accepting the candidate pupil cluster as the pupil image.

Figure 13:
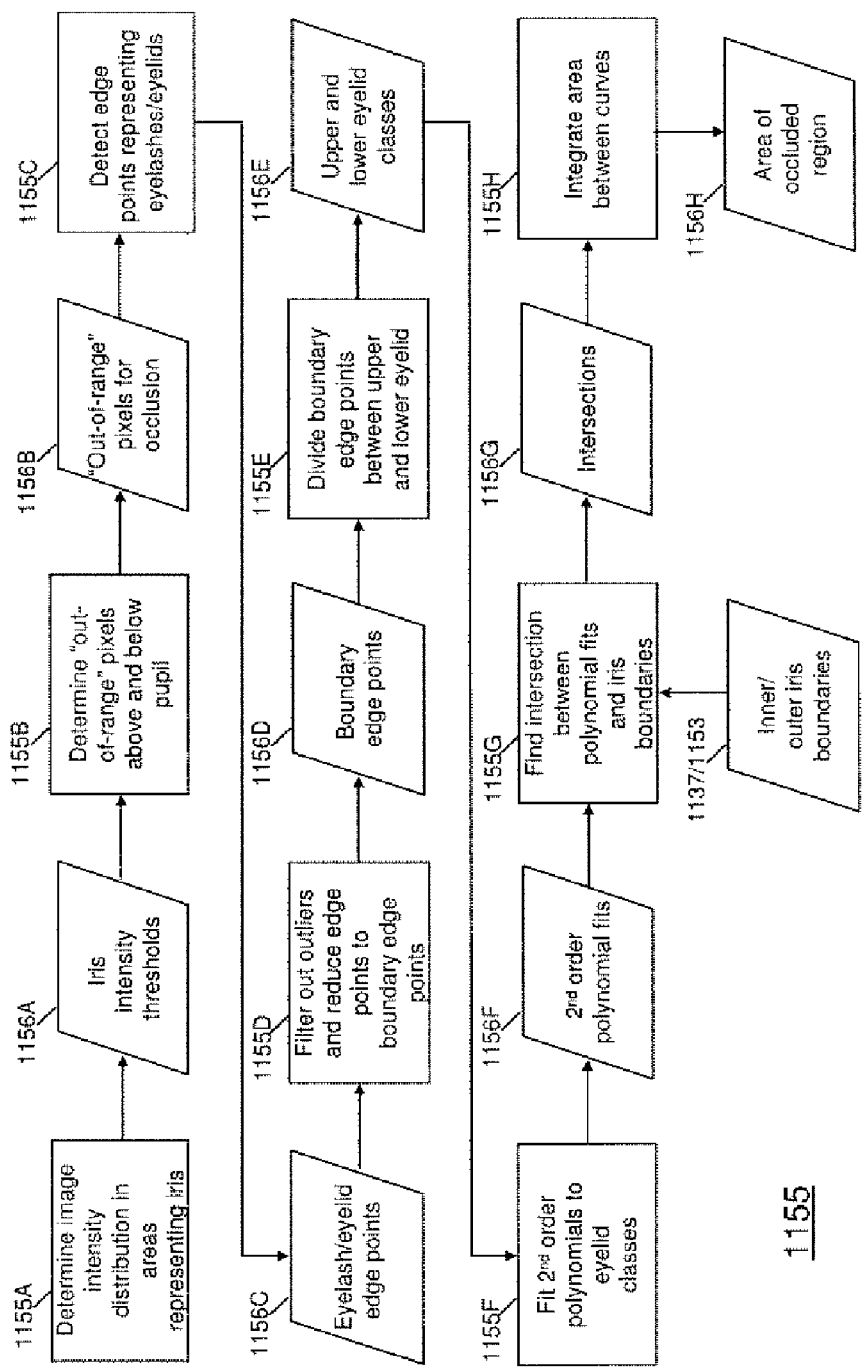
FIG. 13 illustrates further steps employed by the exemplary digital processing algorithm of FIG. 11 corresponding to eyelid/eyelid segmentation.

As discussed previously, the digital processing algorithms 1010 may also include an eyelash/eyelid segmentation algorithm 1013. As an example, FIG. 11 further illustrates step 1155 which computes the magnitude of occlusion 1156H of the iris image from a Cartesian image. In other words, step 1155 determines how much of the iris image 1002 is represented in the calculated annular region 1154 between the calculated inner iris boundary 1137 and outer iris boundary 1153. FIG. 13 illustrates the step 1155 in further detail. Step 1155A analyzes the image intensity distribution in two relatively small areas in the annular region 1154 and slightly below the pupil. In general, these areas are least affected by extraneous occluding features, such as eyelids, so the image intensity distribution in these small areas typically represent an image intensity corresponding to the iris. Therefore, iris intensity thresholds 1156A may be derived from the image intensity distribution in these small areas. Step 1155B applies the derived intensity thresholds 1156A to detect "out-of-range" pixels 1156B to find areas of occlusion, generally above and below the pupil. Step 1155C then employs narrow search windows to the left and to the right of the calculated annular region 1154 to detect edge points 1156C representing eyelids and/or eyelashes. Step 1155D filters out outliers and reduces the sets of edge points to edge points 1156D that correspond to the imaginary boundaries for the occluded regions in the eye image 1001. In step 1155E, the boundary edge points 1156C, as well as intensity points, are divided into classes corresponding to the upper eyelid and the lower eyelid. Step 1155F then fits second order polynomials to the two classes, or groups, 1156D corresponding to the upper eyelid and the lower eyelid. Step 1155G then finds intersections 1156G between the polynomial fits 1156F with inner iris boundary 1137 and outer iris boundary 1153. Finally, the area 1156H of the occluded regions of the iris image is computed in step 1155H by integrating pixels between the corresponding curves defined by the polynomial fits 1156E, inner iris boundary 1137, and outer iris boundary 1153.

For eyelid/eyelash segmentation, some embodiments may employ a two-stage technique that first applies coarse detection in a first stage and a fine-scale mask generation in a second stage. Coarse detection provides a fast technique which can be employed real-time to measure roughly how much the upper and lower eyelids and eyelashes cover the iris in the captured eye image. In particular, coarse detection is able to provide fast and efficient results by only testing the areas in the image that are most susceptible to eyelid/eyelash occlusion. As such, the first stage may advantageously be employed at the time of image capture to reject quickly the images with low iris image quality resulting from heavy eyelid/eyelash occlusion. Indeed, the software approach of embodiments of the present invention attempts to capture the best possible images of the subject so biometric identification can be performed with more precision.

On the other hand, the second stage is a slower but more accurate technique employing pixel-wise mask generation. In pixel-wise mask generation, every pixel in an unwrapped image is tested, or measured, to determine whether the pixel is a part of the iris image or whether it is noise associated with an eyelid or eyelash image. Accurate pixel-wise mask generation may be applied more appropriately at the time of matching. In some embodiments, the first stage may apply the same technique as the second stage, but in a faster, more selective manner. As such, FIG. 14 illustrates a further embodiment of a digital processing algorithm 1013 which may be employed for two-stage eyelid/eyelash segmentation.

Figure 14:
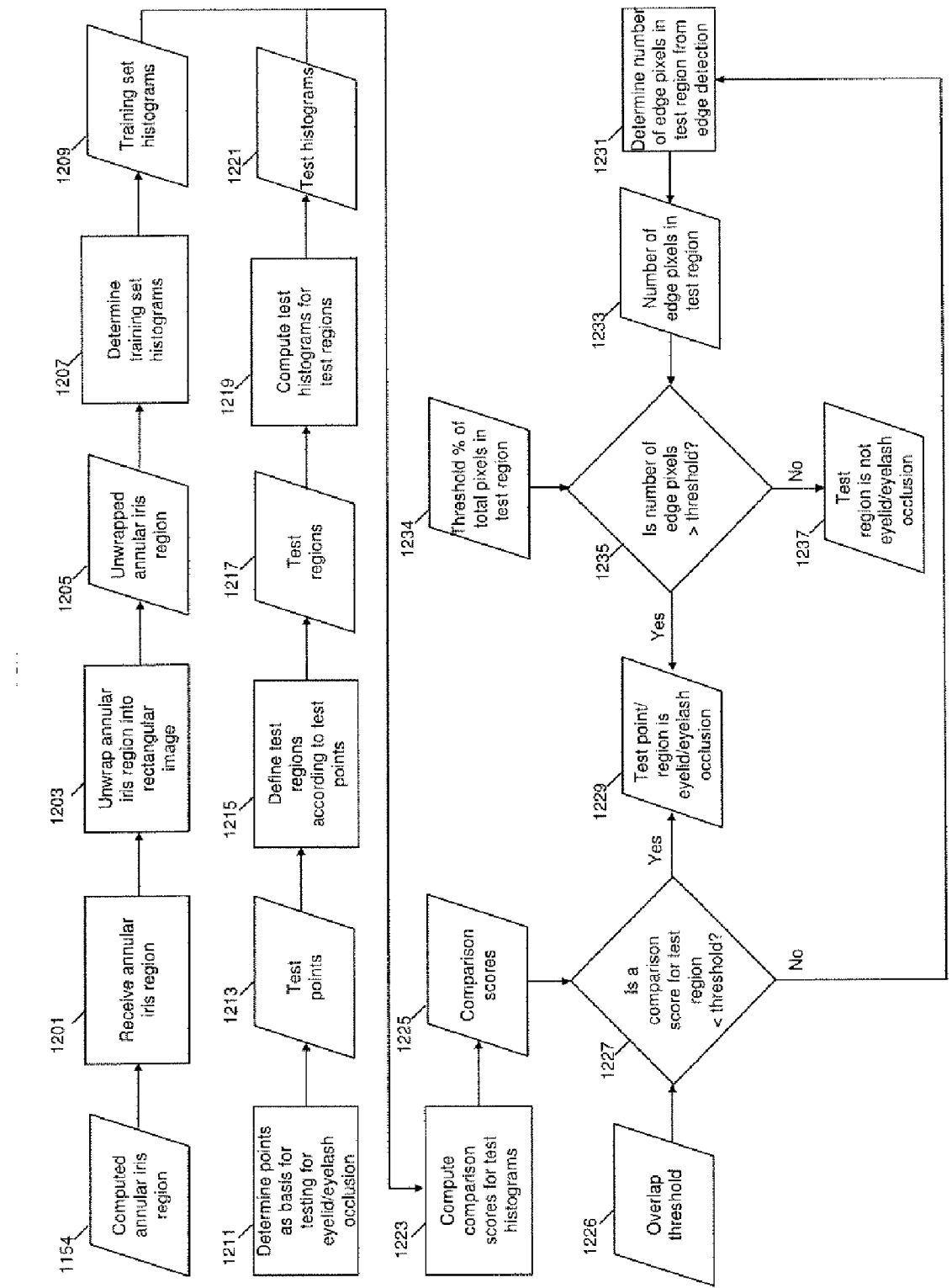
FIG. 14 illustrates an exemplary digital processing algorithm for eyelid/eyelash segmentation which may be employed by embodiments of the present invention.
Figure 15:
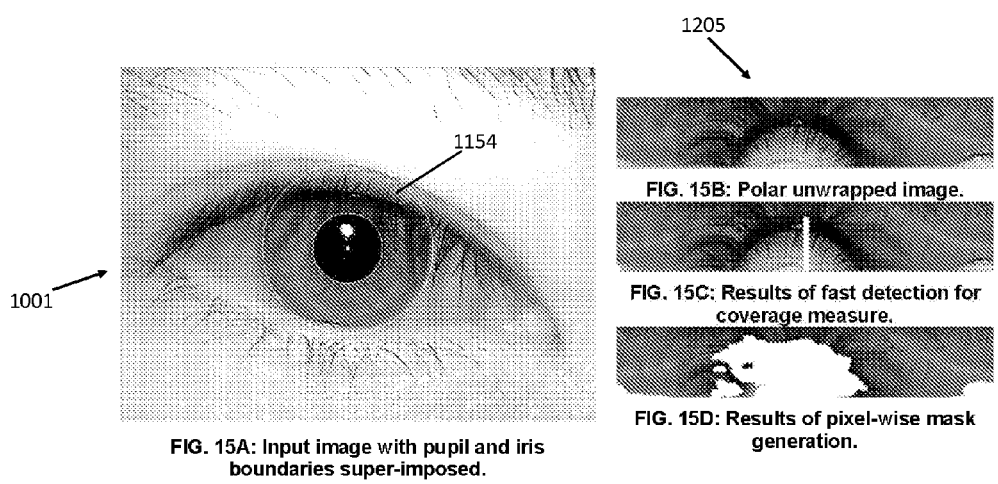
FIG. 15A illustrates an annular iris region calculated for captured eye image, which is processed by the exemplary digital processing algorithm of FIG. 14.
FIG. 15B illustrates a rectangular image which results from unwrapping the annular iris region of FIG. 15A according to the exemplary digital processing algorithm of FIG. 14.
FIG. 15C illustrates exemplary results of coarse, or fast, detection to determine a coverage measure corresponding to eyelid/eyelash occlusion, as determined by the exemplary digital processing algorithm of FIG. 14.
FIG. 15D illustrates exemplary results of pixel-wise mask generation to determine a coverage measure corresponding to eyelid/eyelash occlusion, as determined by the exemplary digital processing algorithm of FIG. 14.

As shown in FIG. 14, the exemplary embodiment first computes a set of training histograms from an unwrapped image from regions empirically believed to be free of occlusion. Test histograms are then be computed from neighborhoods of all pixels and tested for dissimilarity in relation to the training set histograms. Thus, this embodiment employs iris intensity modeling from regions free of eyelid/eyelash occlusion as a basis for determining whether other regions of the eye image 1001 correspond to eyelid/eyelash occlusion.

Referring to FIG. 14, data regarding iris segmentation, for example annular region 1154 as determined by SPM, are initially received in step 1201. In step 1203, the annular iris region 1154 is unwrapped into a rectangular image 1205 of fixed size, e.g. 512×64, using a polar unwrapping technique. FIG. 15A illustrates the annular iris region 1154 calculated for captured eye image 1001, while FIG. 15B illustrates the rectangular image 1205 which results from step 1203.

Step 1207 then determines training set histograms 1209 in the unwrapped image for regions that are empirically and anatomically observed to be free of eyelid/eyelash occlusion. For example, in one particular embodiment, 8 training set histograms with 32 bins per histogram may be computed from non-overlapping rectangular regions from the unwrapped image around 90° (W/4) and 270° (3*W/4) locations. The rectangular area of width 40 pixels and height 8 rows in the lower eyelid region on either sides of the upper eyelid region is combined to generate each of the 8 training set histograms. The choice of parameters ensures sufficient image data points per histogram. The raw training set histograms are then normalized to convert them into probability distributions.

Once the training histograms 1209 have been computed in step 1207, a set of test points 1213 within the eye image 1001 may be selected in step 1211 to form the basis for defining test regions 1217 in step 1215. For instance, step 1215 may define the test regions 1217 as widths of pixels centered at the test points 1213 at each row of the unwrapped image 1205. The algorithm determines whether these test regions 1217 are part of an eyelid/eyelash occlusion. In particular, in step 1219, a test histogram 1221 is computed for each test region 1217. The normalized test histogram 1221 from each test region 1217 is then compared in step 1223 against all the training set histograms 1209, one by one. The comparison is based on histogram similarity computed by histogram intersection score 1225 defined as:

$$S_{j,k} = \sum_{b=1}^{B} \min(Ts_b^j, Tr_b^k),$$

where B represents the total number of bins in the binned histogram representation (e.g., 32 bins in an exemplary embodiment), $Ts\_^j$ corresponds to the test histogram at $j^{th}$ test set level, $Tr\_^k$ corresponds to the $k^{th}$ training set histogram. For example, if the training set 1209 contains 8 histograms of size 8×40 each, variable k goes up to 8; on the other hand, if the test histograms are of size 1×40, the variable j goes up to 64. An overlap threshold 1226, e.g. 33% corresponding to a normalized score of 0.33, between normalized histograms may be defined. Step 1227 determines if the similarity between a particular test histogram 1221 and all the training set histograms 1209 is less than the threshold 1226. If so, the test is declared to fail, indicating that the test region 1217 belongs to an eyelid/eyelash occlusion.

It is duly noted that eyelid/eyelash segmentation in this embodiment employs gray-level histograms merely as a tool for density estimation of the iris/non-iris intensities in an unwrapped iris image. The technique described above is does not depend on the use of histograms. Indeed, more sophisticated density estimation approaches, especially Kernel Density Estimation (KDE) may also be used. KDE is discussed in E. Parzon, "On estimation of a probability density function and mode", Annals of Mathematical Statistics, 33:1065-1076, 1962, which is entirely incorporated herein by reference. To compare histograms and KDE representation in an example, one may consider the generation of a training set histogram. Let the gray-scale pixel values corresponding to the region in unwrapped image under analysis be $\{x_1, \ldots, x_n\}$, n being the total number of pixels in the region. For a 32-bit histogram, the range of a gray-level pixel value for 8-bit image is 0-255 inclusive. This range is divided into 32 cells of equal dimension, so every 8th gray-scale value quantizes to a different bin. A histogram estimates the density of underlying gray-scale values as:

$$\hat{p}(x) = \frac{n_j}{\sum_{j=1}^{N} n_j}$$

where $n_j$ represents the number of pixels in the region being currently analyzed whose gray-scale intensities lie in the range of $j^{th}$ histogram cell, and N represents the total number of histogram cells, 32, in our case. Also, note that $$\sum_{j=1}^{N} n_j = n.$$

Using KDE framework, the density estimation from the pixels of same image region is computed using a kernel of bandwidth (spread or smoothing parameter, h) as:

$$\hat{p}(x) = \frac{1}{nh} \sum_{i=1}^{n} \frac{1}{\sqrt{2\pi}} \exp\left(-\frac{1}{2}\left(\frac{x-x_i}{h}\right)^2\right)$$

In the above representation, Gaussian kernel of width h is used to derive a smoothed representation of the underlying density. Using this approach, a continuous and smoothed density estimate is derived which, in some cases, might result in a better representation of the training/test regions as compared to representation using histograms.

In some instances, the technique based only on gray-scale image intensity might fail to give sufficient results, particularly for the eyelid region, because dark eyelashes combined with bright eyelid may create a histogram similar to that of iris texture pattern. Thus, as further illustrated by FIG. 14, another level of testing in step 1231 may be employed by checking the edge content in the particular test region 1217. For instance, if step 1227 determines that the comparison score 1225 is not less than the overlap threshold 1226, step 1231 determines the number of edge pixels 1233 in the test region 1217. Edge detection may be performed using Canny edge detector with lower threshold of 0, upper threshold of −1 and using a Gaussian window of sigma 1. If the number of edge pixels 1233 in the test region 1217 exceeds a threshold 1234, e.g. 10%, of the total pixels in the test region 1217, the test region 1217 is marked as an eyelid occlusion.

As discussed previously, this eyelid/eyelash segmentation technique may be employed for first stage coarse detection, which only tests the areas in the image that are most susceptible to eyelid/eyelash occlusion. In an example embodiment, once the training set histograms 1209 have been determined in step 1207, the set of test points selected by step 1211 may include two vertical columnar areas 1213 which lie at 180° (W/2) and 360° (W) locations corresponding to upper and lower eyelids respectively. Moreover, step 1215 may define the test regions 1217 as widths of 40 pixels centered at the test points 1213 along the two vertical columnar areas, at each row of the unwrapped image 1205. The algorithm determines whether these test regions 1217 are part of an eyelid/eyelash occlusion by computing a test histogram 1221 for each test region 1217 as described previously. FIG. 15C illustrates exemplary results of coarse, or fast, detection to determine a coverage measure corresponding to eyelid/eyelash occlusion.

In addition, the histogram test data and the edge detection data produced by the algorithm of FIG. 14 complement each other and may be used to determine a coverage measure for first stage coarse detection. In other words, this embodiment provides the total number of points that pass the test of belonging to the iris image 1002. The coverage measure at this fast detection stage, $C_D$, is then computed as:

$$C_D = \frac{N_i}{N_T},$$

where $N_i$ is the number of pixels belonging to unoccluded iris pattern and $N_T$ denotes the total number of points tested. ANSI specifications for iris image capture and interchange dictate that the minimum coverage measure (the ratio of noise pixels to total iris pixels) is to be 0.7 on a scale of 0 (no iris texture pixel) to 1 (no noisy pixels from eyelid or eyelash). As such, the first stage coarse detection may reject the frames with a coverage measure falling below 0.7. In this way, all subsequent stages of iris recognition work on frames pass the ANSI specification of good iris images in terms of eyelid and eyelash noise.

As described previously, the eyelid/eyelash segmentation technique of FIG. 14 may also be employed for second stage pixel-wise mask generation. In an example embodiment, once the training set histograms 1209 have been determined in step 1207, the set of test points for step 1215 includes every pixel in the unwrapped image. Step 1215 may define the test regions 1217 as areas of 8×80 centered at each pixel. The algorithm determines whether these test regions 1217 are part of an eyelid/eyelash occlusion by computing a test histogram 1221 for each test region 1217. If a test histogram 1221 for a test point 1217 has an intersection similarity, i.e. comparison score 1225, with any one of the training set histograms 1209 that is above the threshold 1226, the pixel at the test point is marked as an iris texture pixel. To adjust for the iris-like gray-scale histogram presented at the region of the eyelid, the edge data from Canny edge detector is used as in the first stage. This gives a binary mask with pixels corresponding to occlusion marked "1" and iris texture pixels marked "0". The coverage measure from the mask, $C_M$, is then computed as:

$$C_M = \frac{N_i}{W \times H},$$

where $N_i$ is the number of pixels belonging to un-occluded iris pattern, and W and H denote image width and height. Finally this binary mask is used in iris code generation for only the occlusion-free pixels. This way, the effect of noise due to eyelid and eyelash occlusion is avoided in the resulting iris code. FIG. 15D illustrates exemplary results of pixel-wise mask generation.

Figure 16:
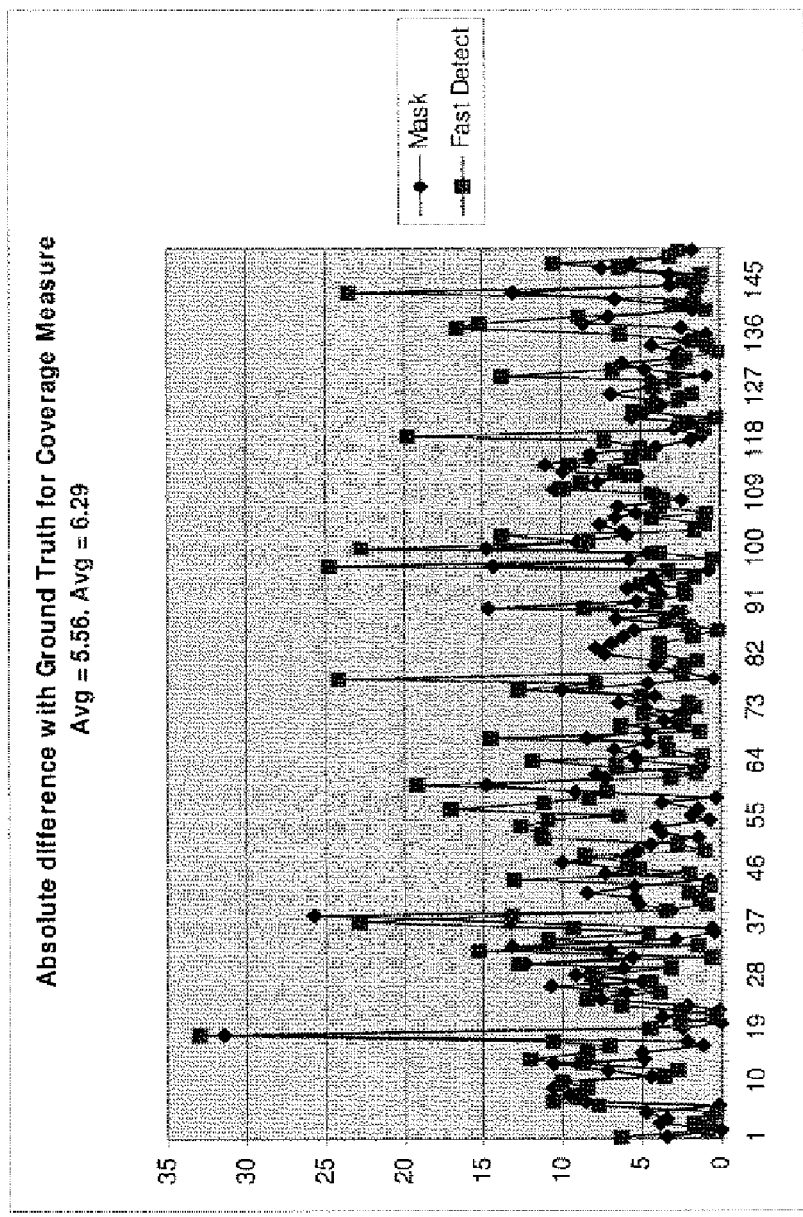
FIG. 16 illustrates an example of the absolute difference in percentage coverage measure between ground truth and fast, or coarse, detection (marked as "Fast Detect") and between ground truth and pixel-wise mask generation (marked as "Mask").

Accordingly, the embodiment presented in FIG. 14 employs the gray-scale intensities of iris and non-iris regions for eyelid/eyelash segmentation. To demonstrate the effectiveness of the algorithm of FIG. 14, FIG. 16 illustrates an example of the absolute difference in percentage coverage measure between ground truth and fast, or coarse, detection (marked as "Fast Detect") and between ground truth and pixel-wise mask generation (marked as "Mask").

Figure 17:
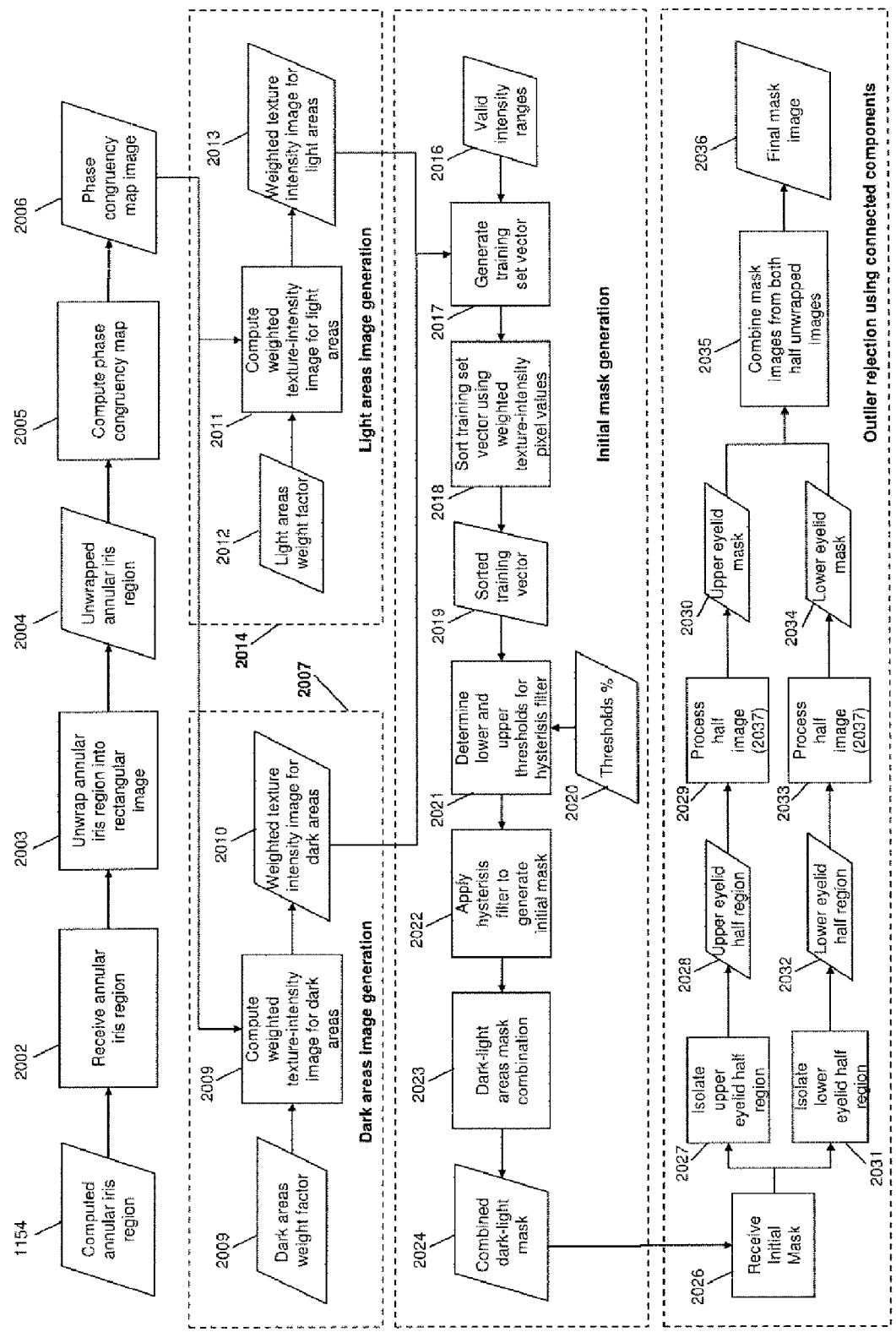
FIG. 17 illustrates another exemplary digital processing algorithm for eyelid/eyelash segmentation which may be employed by embodiments of the present invention.
Figure 18:
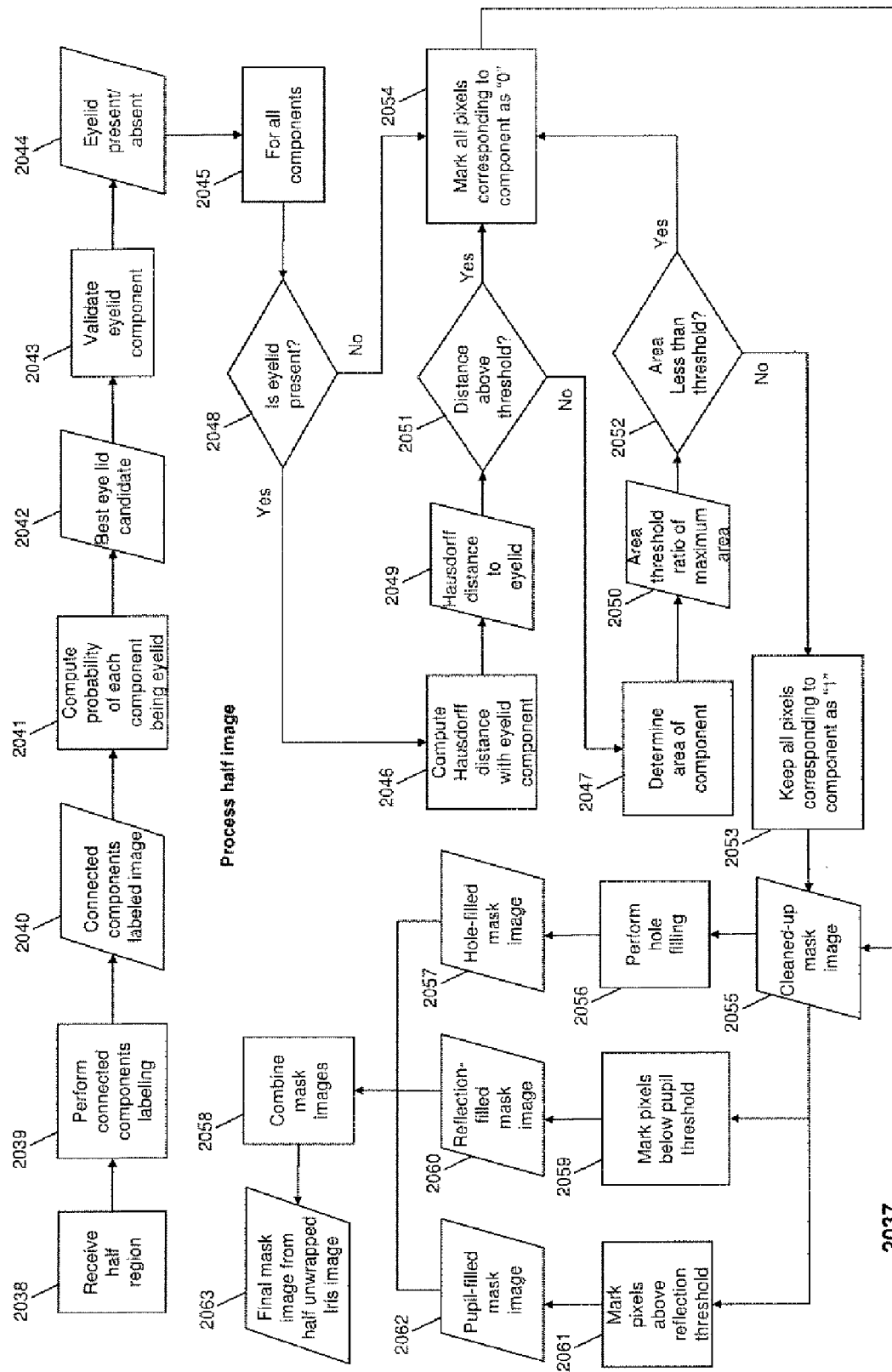
FIG. 18 illustrates further steps employed by the exemplary digital processing algorithm of FIG. 17.

An alternative embodiment for providing an accurate mask generation process, illustrated in FIGS. 17 and 18, models the texture pattern of the iris regions more explicitly to distinguish it from non-iris regions in the unwrapped image. In particular, the texture modeling in this alternative embodiment is performed using a bank of log-Gabor filters to generate a texture representation based on the phase congruency feature-space. This feature space analyzes the spectrum of the given image at various frequencies to compute the alignment of phase at a feature location. For example, if there is a step edge present in an image, then in the frequency spectrum of the image, different phase components have a zero-crossing at the location of the edge point. This observation motivates using congruence of a multitude of phase components to represent dominant features in the image. The computation of phase congruency using log-Gabor wavelet filter banks is discussed in Peter Kovesi, "Invariant Measures of Feature Detection", Ph.D. thesis, The University of Western Australia, 1996, which is incorporated entirely herein by reference.

Referring to FIG. 17, data regarding iris segmentation, for example annular region 1154 as determined by SPM, is initially received in step 2002. In step 2003, the annular iris region 1154 is unwrapped into a rectangular image 2004 using a polar unwrapping technique. Using the polar unwrapped image 2004, a phase-congruency map image 2006 is generated using a bank of log-Gabor filters in step 2005. This bank consists of a set of orientation and scale filters tuned to various frequencies in order to generate sharper response at particular image feature points. Indeed, the image features that help distinguish an iris pattern from non-iris patterns can occur at various orientations and at various sizes. This method captures these features at various orientations and various sizes and combines the results from all the filters to generate iris texture pattern representation for use in image mask generation. The resulting phase congruency map image values range from 0 to 1 (as opposed to 0-255 for 8-bits gray-scale images).

As shown further in FIG. 17, the embodiment creates a weighted texture-intensity image 2010 for dark areas and a weighted texture-intensity image 2013 for light areas 2013 via process 2007 and process 2014, respectively. The phase congruency image 2006 and iris intensity image in the polar unwrapped image 2004 are used to generate the images 2010 and 2013. Weighted texture-intensity image for dark areas, 2010, is generated in step 2008 as:

$$I^d(x, y) = P(x, y) + \overline{\omega}^d \left(1 - \frac{I(x, y)}{255}\right)$$

where $I^d(x,y)$ represents a pixel at x,y location in the texture-intensity weighted image 2010 for dark areas, P(x,y) represents pixel at the same location in the phase congruency image 2006, $\overline{\omega}^d$ represents dark areas weight factor 2009 (an exemplary value is 0.625), and I(x,y) represents a pixel at same location in iris intensity image. The weighted texture-intensity image for light areas, 2013 is generated in step 2011 as:

$$I^l(x, y) = P(x, y) + \overline{\omega}^l \left(\frac{I(x, y)}{255}\right)$$

where $\overline{\omega}^l$ represents a weight factor 2012 for light areas (an exemplary value is 0.5).

From the weighted texture-intensity images 2010 and 2013, the process 2015 generates an initial mask image 2024. Similar to the embodiment of FIG. 14, step 2017 generates a training set vector from designated areas, deemed free of eyelid/eyelash segmentation. In addition, processing in step 2017 may be limited to weighted texture-intensity values that correspond to pixels having original image intensities within a valid intensity range 2016. In step 2018, the training vector is sorted on texture-intensity values. Dynamic upper and lower thresholds 2021 for hysteresis filtering are the generated from the sorted vector 2019 and fixed upper and lower thresholds 2020 (e.g., 97% and 93%). Step 2022 employs the resulting upper and lower thresholds computed in step 2021 to apply a hysteresis filter. The hysteresis filtering results from dark and light areas are then combined in step 2023 to generate a combined initial mask 2024.

In particular, the process 2015 generates an unwrapped binary image mask 2024, in which every pixel is marked "1" for occlusion and "0" for iris pixel. The binary image 2024, however, may contain undesirable levels of eyelid/eyelash regions that are marked erroneously as iris regions, or vice versa. In one case, the binary mask image 2024 may contain holes corresponding to imperfect occlusion marking. This phenomenon may result from the fact that the iris texture pattern is combined with gray-scale intensity at every pixel to generate a fused representation of the pixel. Thus, at some eyelid/eyelash pixel locations, the local structure might resemble that of the combined iris texture and intensity representation. In the opposite case, the unwrapped mask image 2024 may contain small regions inside the iris region that are improperly marked as eyelid/eyelash occlusions. This phenomenon occurs when a large population of human irises is involved and certain local structures arise which do not represent a pattern typical of most of the irises.

As illustrated further in FIG. 17, the embodiment presented herein may correct for such imperfections in the mask image 2024 by employing process 2025 which involves connected components labeling. Alternatively, the process 2025 may employ the histogram technique described previously with reference to the embodiment of FIG. 14. Referring to FIG. 17, the steps 2027 and 2031 isolate the upper eyelid region 2028 and lower eyelid region 2032, respectively. The half-images having a size of (W/2)×H are processed separately in steps 2029 and 2033 using the process 2037 illustrated in FIG. 18. If, for example, the annular iris image 1154 is unwrapped into 512×64 pixels, the rectangular non-overlapping regions representing the two independent halves of size 256×64 are processed separately. The upper eyelid mask 2030 and the lower eyelid mask 2034 are then combined together in step 2035 to generate a final mask image 2036.

The half-image processing shown in FIG. 18 first receives a half region, i.e. the upper eyelid region 2028 and lower eyelid region 2032, in step 2038. Step 2039 then performs connected components labeling on half-image binary mask received in step 2038. In particular, step 2039 generates a set of regions (groups of pixels) that are marked as "1", i.e. occlusions, and that share spatial boundaries based on 8-connected neighborhood. As such, step 2039 produces a connected components labeled image 2040. Step 2041 then computes the probability that each connected region is an eyelid component. This computation is based on the fact that the eyelid region presents the pattern of a large area component with a high value for its maximum y-coordinate. As such, the eyelid component may be inferred as the solution to the following equation:

$$C_{lid} = \underset{i}{\operatorname{argmax}}\left(\alpha \frac{Y_{max}^i}{H} + \beta \frac{A^i}{\left(\frac{W \cdot H}{2}\right)}\right)$$

where α and β denote weights for y-coordinate and area components, $Y_{max}^i$ and $A^i$ represent the maximum y-coordinate and area of the $i^{th}$ connected component, and W and H represents the width and height of unwrapped image respectively. Thus, step 2041 generates the best eyelid candidate 2042. As a result of the iris unwrapping, the eyelid component is constrained to have a maximum y-component close to the unwrapped image height within a tolerance $\Delta_y$ of the unwrapped image height. If this final condition does not hold, the best eyelid candidate 2042 from step 2041 is invalidated in step 2043. In particular, step 2043 generates a flag 2044 that indicates the presence or absence of the eyelid component.

As FIG. 18 also shows, the process 2037 cleans up regions inside the iris pattern which are marked as occlusions. For example, the connected components that are either too small or too far from the eyelid connected component are marked as iris regions. Initially if step 2048 determines that the eyelid is not present according to the flag 2044, all pixels corresponding to the connected components are rejected from the occlusion mask and marked as iris pixels. Indeed, if the largest form of occlusion, an eyelid, is not present then the chance for the presence of other occlusion significantly reduces. If an eyelid is present according to flag 2044, the occlusion mask pixels are not changed at step 2048. In this case, step 2046 then computes the Hausdorff distance between each connected component set from the eyelid connected component set. The resulting Hausdorff distance 2049 for the current connected component is then employed to determine if the current component should to be rejected from the occlusion mask. The current connected component is rejected if the connected component is more than $\Delta_H$ pixels away from eyelid component according to step 2051. Otherwise, if the connected component is not more than $\Delta_H$ pixels away from eyelid component, the occlusion pixels are not changed at step 2051. The current connected component is also rejected from the occlusion mask if the area 2050 of the connected component determined in step 2047 is less than a threshold $\Delta_A$ according to step 2052. Otherwise, if the area 2050 is not less than the threshold $\Delta_A$, the occlusion pixels are not changed at step 2052. Accordingly, pixels in the iris region marked as occlusions are rejected from the occlusion mask and correctly marked as iris pixels.

As further shown in FIG. 18, once the cleaned up, or updated mask image is produced, mask post-processing is launched for the current half of the unwrapped iris image. In this phase, step 2056 fills in the holes in the half unwrapped iris image mask. Step 2056 may be required because excessive eyelid occlusion may occur and render false the assumption that eyelashes and the dominant portion of eyelid present a texture and intensity level different from the iris region. Therefore, step 2056 may iterate over all columns of the updated binary mask and identify the columnar strips which are bound on the lower and upper ends by pixels marked as occlusions, i.e., "1," but have some pixels marked as iris, i.e., "0". After identification of these upper and lower bounds and gaps in the columnar strips, step 2056 marks the pixels between bounding points as "1" to indicate an occlusion pixel. Step 2056 produces a hole-filled mask image 2057. In addition, step 2059 identifies isolated pixels that have intensity above a maximum intensity threshold and qualify as reflection noise. Such pixels are marked as occlusion noise in step 2059, which produces a reflection-filled mask image 2060. Finally, step 2061 identifies pixels that have intensity below a minimum intensity threshold and qualify as pupil pixels. Such pixels are marked at occlusions by step 2061, which produces a pupil-filled mask image 2062. It is noted that the presence of pupil pixels may be drawn into the iris region during the segmentation and unwrapping process. The resulting mask images 2057, 2060 and 2062 are combined in step 2058, which generates the final mask image 2063 for the half unwrapped iris image received in step 2038.

Example results of the mask generation and outlier rejection process are illustrated in FIGS. 19A-H. FIGS. 19A, C, E, and G illustrate four unwrapped iris images 2101, 2103, 2105, 2107, while FIGS. B, D, F, and H respectively illustrate their corresponding masks 2102, 2104, 2106, 2108.

As discussed previously, with reference to FIG. 10, the digital processing algorithms 1010 may also include an iris focus measurement algorithm 1014. Advantageously, the effect of eyelashes, the texture of the iris, and/or other noise are minimized with both embodiments of iris focus measurement algorithms, shown in FIGS. 20A and 20B.

Figure 20A:
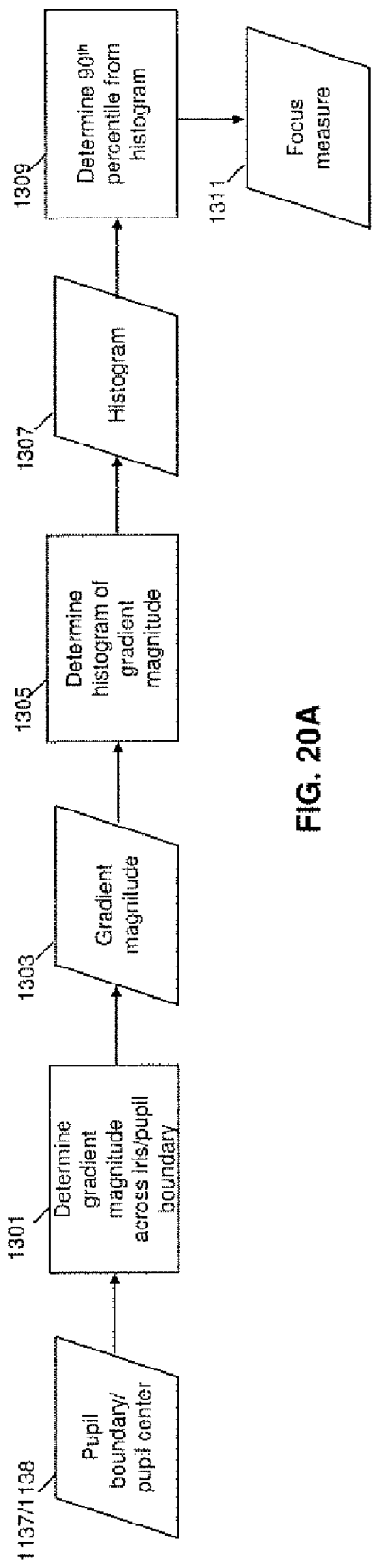
FIG. 20A illustrates an exemplary digital processing algorithm for iris focus measurement, which employs a gradient technique across the iris/pupil boundary.

FIG. 20A illustrates one embodiment of an iris focus measurement algorithm 1014, which employs a gradient technique across the iris/pupil boundary. Using the pupil boundary 1137 and the pupil center 1138, for example as determined by SPM, step 1301 determines the gradient magnitude 1303 across the iris/pupil boundary 1137 in a radial direction with respect to the pupil center 1138. Step 1305 then creates a histogram of the gradient magnitude 1303. Using the histogram 1307, the 90 percentile value of the gradient magnitude 1303 is calculated in step 1309 as the focus measure 1311, which may be normalized to a scale of 0 to 1, 0 to 100, etc. In particular, the gradient method of FIG. 20A minimizes the effect of noise by using the 90 percentile value of the accumulated histogram. The use of a 90 percentile value of the magnitude histogram has been provides a reliable focus measure.

Figure 20B:
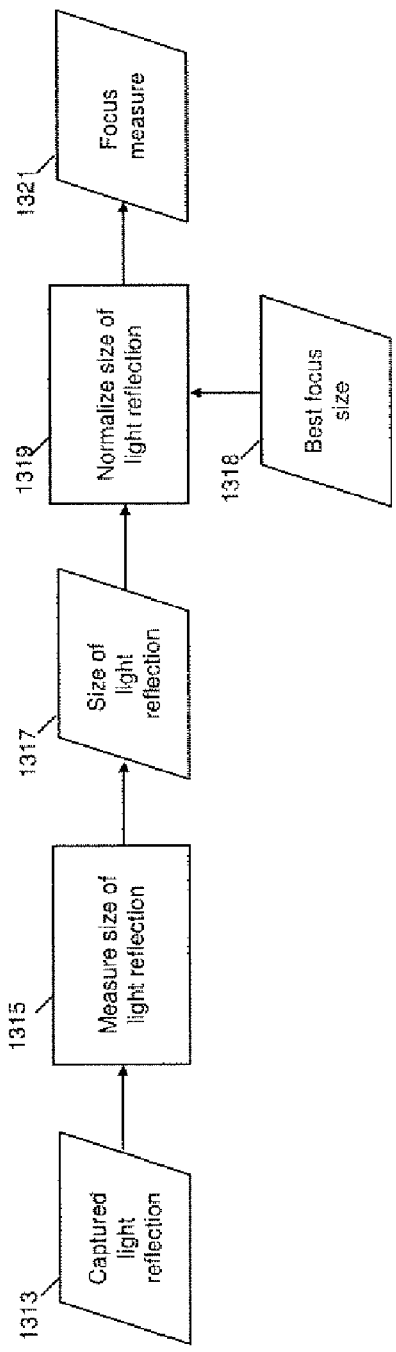
FIG. 20B illustrates another exemplary digital processing algorithm for iris focus measurement, which employs a gradient technique across the iris/pupil boundary.

FIG. 20B illustrates another embodiment of an iris focus measurement algorithm 1014, which employs the lighting reflection from image capture. As described herein, to capture an eye image, embodiments of the present invention employ a camera sensor and a light setting which produce a light reflection 1313. The measure of focus is in proportion to the size and the clarity of the light reflection 1313. Thus, step 1315 measures the size 1317 of the light reflection 1313. As the size 1318 of light reflection at the best focus point is ascertainable, step 1319 determines a normalized value for the focus measure 1321 based on the ratio of the measured size 1317 and the best focus size 1318. In particular, this embodiment avoids the effect of noise by using the actual lighting reflection. The application of this embodiment may vary according to the acquisition, because the reflection size varies from device to device.

With respect to other approaches for obtaining a focus measure, it has been observed that during actual acquisition of iris images, the use of image frequency based focus measure (for example, as described in U.S. Pat. No. 6,753,919) disadvantageously obtains the best focus images for eyelashes or eyebrows and not the iris, because eyelashes and eyebrows may contain high frequency content. In addition, it has also been discovered that the use of the total magnitude of gradient (for example, as described in U.S. Pat. No. 5,404,163) instead of radial magnitude is sensitive to the pattern of the iris and thus not usable for iris focus. Furthermore, Int'l Pat. Pub. WO 99/27845 describes the use of a radial gradient where the division of the average of the magnitude divided the step size provides the focus measure, but this technique has been found to be sensitive to noise.

In one aspect, the digital processing algorithms 1010 enable the three dimensional position of the iris for the left eye and/or the right eye to be determined with respect to the multimodal ocular biometric device. For example, information regarding position along X- and Y-axes may be determined from the pupil segmentation algorithm 1011 while information regarding position along the Z-axis may be determined from the iris focus measurement 1014. Accordingly, as described further below, such data may be used to determine whether the iris images captured by the sensor 110 are of acceptable quality and should be used for further biometric evaluation.

Figure 21:
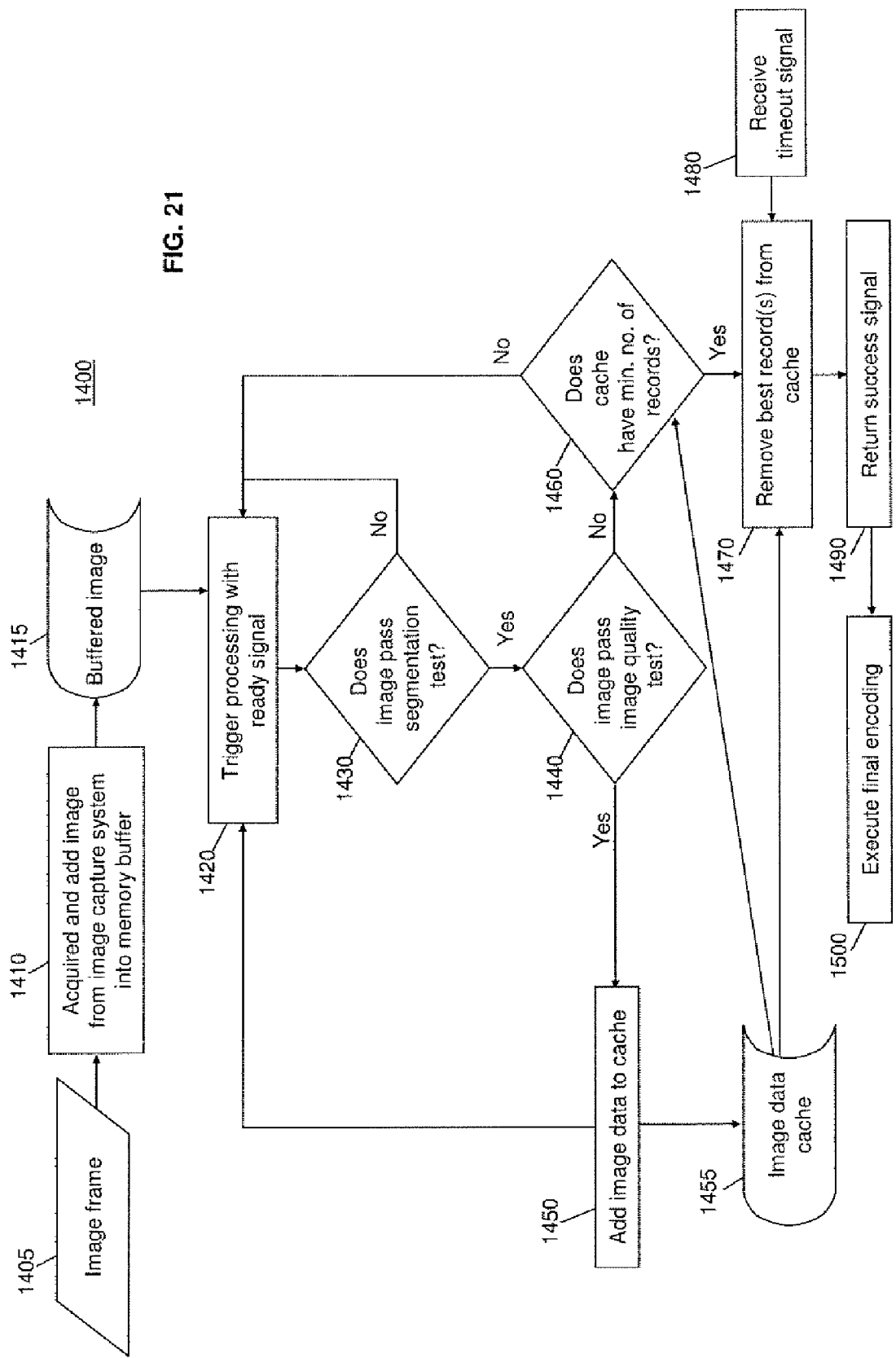
FIG. 21 illustrates an exemplary approach for capturing an iris image, which may be employed by embodiments of the present invention.
Figure 22:
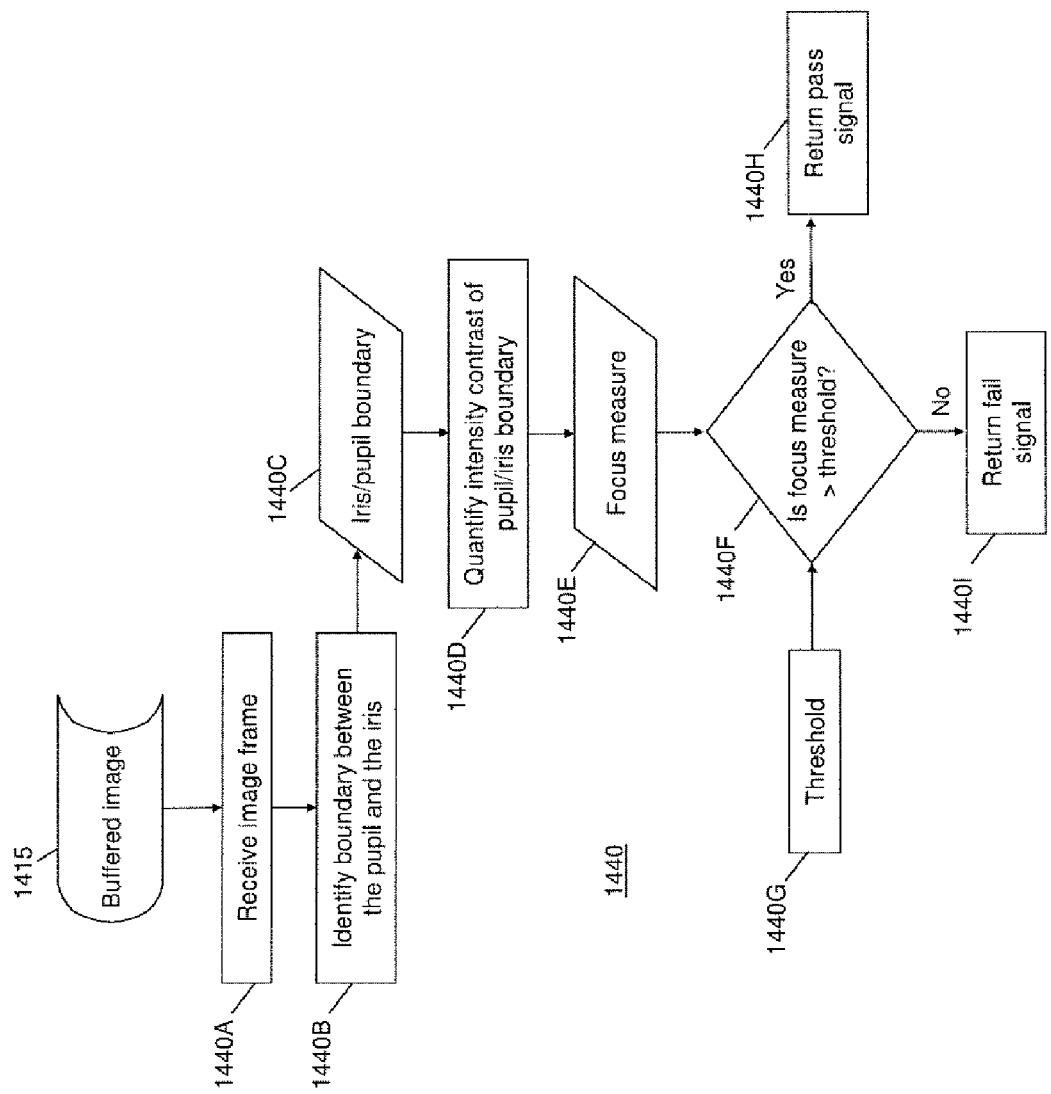
FIG. 22 illustrates further aspects of the exemplary approach of FIG. 21 for capturing an iris image.

For some embodiments of the present invention, aspects of capturing an iris image are described with reference to FIGS. 21 and 22. As described previously with reference to FIG. 1, a plurality of image frames may be received from camera sensors 110 which capture light from an eye, particularly the iris, which reflects the emitted light from the illumination source 120. Accordingly, an auto-capture process 1400, as shown in FIG. 21, may extract the required biometric information from the sequence of frames. Step 1410 sequentially receives each of the image frames 1405 into memory in the form of an image bitmap. In step 1420, a ready signal is triggered for processing of the image frame when the bitmap transfer from the camera, e.g. sensor 110, is complete.

In an alternative embodiment, numbered image frames 1405 are transferred from the camera to a circular memory buffer in the form of image bitmaps. This circular buffer is continually updated as image frames 1405 are transferred from the camera. Initially, processing is started when the first image frame 1405 is read into the circular memory buffer.

Processing threads then transfer the latest image bitmap into memory local to the thread. The processing thread then processes the image bitmap as described below. On completion of analysis, if processing has not been terminated, the thread then transfers the next image bitmap from the circular buffer to memory and repeats processing steps for this image. In this manner, it is possible for the invention to miss or drop video frames from processing. In other words, as the processing steps are applied to a single image bitmap, the circular camera buffer may be updated a number of times before the processing thread transfers the latest image bitmap from the circular buffer. However, it is the goal of the present invention to drop as few video frames as possible. A further alternative embodiment includes an acquisition thread that controls the transfer of image bitmaps from the circular image buffers of each camera to the processing thread. For systems with multiple cameras, such as the multimodal biometric system 10 and other embodiments described herein, multiple circular image buffers for a system may be employed where each circular image buffer is controlled by acquisition threads that feed images to single or multiple processing threads. The processing threads may represent different processing steps designed for different purposes.

Referring again to FIG. 21, as a part of a segmentation test, step 1430 tries to identify the inner and outer boundaries of the iris image, for example, with the pupil and iris segmentation algorithms 1011 and 1012 described previously. In addition, step 1430 tries to identify the boundary of the upper eyelid, for example, with the coarse eyelid/eyelash detection algorithm 1013 described previously. If both the inner and outer iris boundaries are identifiable, the image frame passes the segmentation test and further processing occurs with step 1440. Otherwise, the process loops back to step 1420 where the process starts again with the next image frame. In an alternative embodiment, no segmentation test is executed, so step 1420 proceeds on to step 1440 directly. In another alternative embodiment, the test of step 1430 only tries to identify the inner iris boundary, and not the outer iris boundary or the upper eyelid boundary. In yet another alternative embodiment, step 1430 identifies both the inner and outer iris boundaries, but not the upper eyelid boundary.

Step 1440 executes an assessment of the image quality with an image quality test. The details of the image quality test are further illustrated in FIG. 18. Accordingly, the image frame is received in step 1440A, and the step 1440B determines the pupil/iris boundary 1440C, for example, with the pupil and iris segmentation algorithms 1011 described previously. Step 1440D calculates an intensity contrast in an area defined by the pupil/iris boundary according to the gradient technique of the iris focus measure algorithm 1014 shown in FIG. 20A. As described previously, the result of applying the gradient technique is called a focus measure, referenced in FIG. 22 as 1440E. In step 1440F, the focus measure 1440E is compared to a predefined threshold 1440G. If the calculated value exceeded the threshold the image passes the image quality test as shown in step 1440H; otherwise, it fails as shown in step 1440I.

Other embodiments may employ alternative image quality tests. An example uses contrast and/or texture within the identified area of the iris. For instance, a high-pass filter could be used to quantify high frequency components in the iris with the idea that a good quality iris image contains more high frequency components than a lower quality iris image.

Referring again to FIG. 21, if the image frame passes the image quality test in step 1440, the data corresponding to the image frame 1405 is added to an image data cache 1455 in step 1450. This data includes the image frame in the form of a bitmap, its image quality score, and associated information and any segmentation results calculated in step 1430. This data may also be referred to as an image's acquisition-result. When this record is added to the cache 1455, it is placed in ranked order along with any records already within the cache. In other words, the cache 1455 holds a ranked queue of iris acquisition-results derived from the plurality of images processed thus far. The iris acquisition-results may be ranked according to criteria, such as the focus score.

A maximum of M (M≧1) iris acquisition-results are held in the cache. This number may change depending on whether a user is being enrolled, verified, or identified according to the captured biometric data. If, in step 1460, the cache 1455 already contains the maximum permitted number of iris acquisition-results, the current iris acquisition-result replaces the lowest ranking iris acquisition-result in the cache 1455 if the current iris acquisition-result ranks higher. The process then loops back to step 1420 where the analysis of a new image frame 1405 starts.

However, if the image frame 1405 fails the image quality test in step 1440, the process moves on to step 1460. Here the number of iris acquisition-results in the cache 1455 is checked against a defined threshold, N (M≧N). If the cache 1455 does not contain enough iris acquisition-results, then necessarily not enough image frames have thus far passed both the segmentation test, in step 1430, and the image quality test, in step 1440, and the processes loops back to step 1420 where the analysis of a new image frame 1405 starts. If, however, the cache 1455 contains enough records then the process moves onto step 1470.

At step 1470 the top O (N≧O) ranked iris acquisition-results are removed from the cache and, in step 1490, a "successfully acquired" signal is sent to controlling software to indicate that acquisition has succeeded. The auto-capture process 1400 is halted and the process continues to the final encoding step 1500.

At any point during the auto-capture process 1400, a timeout signal, in step 1480, can be received from the controlling software and the auto-capture process 1400 is halted. The processing thread is permitted to continue through to step 1440, if necessary. If the image frame 1405 passes the image quality test of step 1440, the process moves onto step 1450 and then is transferred to the cache 1455. If the image frame fails step 1440 the process moves directly to step 1470.

If fewer than O results are contained in the cache 1455 after all image frames have been analyzed or the auto-capture process 1400 has been halted by timeout in step 1480, the auto-capture 1400 has failed to extract the required information and a "failed to acquire" signal is returned.

At step 1500, the extracted iris acquisition-result(s) are encoded into a biometric format. If the encoded results are being used for biometric verification, the results proceed to matching modules. If the encoded results are being used for biometric enrollment, the results can be compressed and/or encrypted for future use.

An alternative embodiment may analyze time contextual information during the image quality test in step 1440. For example, if an image frame passes the image quality test in step 1440, it then undergoes a time-contextual test. In other words, if the segmentation and/or image quality test results show a significant disparity between a current image frame and the last image frame, the current image fails the time-contextual test and is not considered or added to the iris acquisition-result cache in step 1450.

Accordingly, the digital processing algorithms 1010 illustrated in FIG. 10 may be employed to evaluate whether a captured image should be retained and to identify segments of the captured image from which data can be extracted for biometric enrollment or verification.

With reference again to FIG. 1, once iris image information has been obtained and processed as described above, the retina illumination may employ a tracking system to illuminate the optic nerve head of the retina. For instance, arrays of LED's 220 at a wavelength of 880 nm spaced 1 mm apart are aligned to 1 mm diameter and 10 mm long hollow tubes. The hollow tubes create a homogenizing waveguide for the light emanating from them. Only a single element of the array is illuminated at a time corresponding to the determination of the pupil's position in space, as determined by the digital processing algorithms 1010 described previously. As such, analysis of the iris image yields pupillary positional information that may be employed to determine illumination of the corresponding retina. In other words, the pupil's position is used to determine which LED 220 in the array aligns most optimally with the retina and should be activated for illumination of the retina. Reference numeral 225 in FIG. 1 illustrates a diffuser, which is placed over the ends of the tubes to create a 1 mm spot from the active LED 220.

Alternatively, reference numeral 225 may refer to an LCD shutter, which can create a similar 2-dimensional series of singly activated illuminators that are 1 mm in diameter and imaged to the eye. Depending on the determination of the pupil's position in space, the LCD shutter 225 allows light from the illumination source 220 to pass through an appropriate section of the LCD device 225 to illuminate the retina. As further alternatives, scanning micro-optics or holographic elements may also be employed.

The light from the LCD shutter/diffuser/micro-optics 225 reflects off a polarizing beamsplitter (PBS) 230 creating S polarized light. This light is then imaged by the aspheric objective lens 240, through a long pass plastic sheet filter with a 780 nm cutoff wavelength, to a 2 mm spot just before the nominal position of the cornea. The angle of the light entering the pupil is nominally 15.5 degrees temporal to and 1.5 degrees inferior to the line of sight of the user. The spot diameter is chosen to be smaller than the pupil so that light does not scatter off its edges causing excess noise in the retina image. The divergence of the light is approximately 10 degrees half angle. This allows for imaging of a large enough FOV to obtain a suitable retina image for pattern recognition. The retina image consists of the blood vessel pattern emanating from the optic nerve head. Absorption of the light by hemoglobin and oxyhemoglobin in the blood creates the outline of the blood vessel pattern. Demarcation of the optic nerve head may or may not be discernable. The LED's have three pulse duration settings that are cycled through (exposure bracketing) so as to accommodate for reflectance differences of the retina in the general population.

Light reflecting off the retina passes back through the long pass cutoff filter. This filter prevents ambient visible light from entering the imaging system and creating noise in the image. It also hides the imaging optics from the user. The light is then collected by the aspheric objective lens 240 to produce a real image just before the polarizing beamsplitter 230. This real image is then imaged though the PBS 230 allowing only P polarized light to pass. The purpose of the PBS 230 is to increase the signal to noise ratio of the signal by rejecting any S polarized light reflected back through the system from other optical surfaces. An imaging lens followed by a cubic phase mask optic then images the light onto a camera sensor 210. The camera sensor 210 may be a CMOS detector with high sensitivity to NIR illumination. The CMOS detector has square pixels, has a wide angle format, and has a global shutter.

The images of the retina are multiplied by specific digital filters. These filters are created for differences in dioptric power correction. The images are evaluated using a retina focus measure algorithm and the one with the highest contrast image is preferably utilized for biometric identification. An example of a retinal focus measure algorithm is described in application Ser. No. 11/785,924, filed Apr. 20, 2007, which is entirely incorporated herein by reference.

The illumination for the iris may have a different wavelength from the illumination for the retina. In one embodiment of the present invention, the retina is illuminated with light of a first wavelength, the light of the first wavelength being reflected from the retina to the retina image capturing device. The iris is illuminated with light of a second wavelength that is different from the first wavelength, the light of the second wavelength being reflected from the iris to the iris image capturing device. The first wavelength of light is selected to provide enhanced contrast between biometric features of the retina, such as a retinal vessel pattern, and the background in the captured image. Similarly, the second wavelength of light is selected to provide enhanced contrast for the biometric features of the iris.

If the iris illumination and the retina illumination occur at the same time or in near time, however, the iris illumination can introduce noise in the retina signal, or vice versa. To avoid introduction of noise between the illumination of the iris and retina, dichroic optics can be employed to allow wavelength separation from the different illumination sources, where light of one wavelength is directed to one sensor while light of a second wavelength is directed to another sensor. The illumination with special dichroic optics can be pulsed or run as a continuous wave.

More advantageously, to eliminate the introduction of noise between the illumination of the iris and retina, the iris illumination and the retina illumination can be separated by pulsing the individual LEDs with a synchronized offset. For instance, the iris and retina cameras can run at 30 frames per second offset by half a frame (16.5 ms) with a shutter (global, rolling or global-rolling hybrid) of 10 ms. The pulses from the LEDs occur at 10 ms so that neither camera sees light from the other illumination LEDs. The advantage of pulsing illumination with a synchronous offset is that it freezes motion, maximizes frame rate without having to use dichroics, and allows higher pulse energies which reduces gain on the camera, thereby increasing image quality. Furthermore, pulsing illumination with a synchronous offset permits the use of the same wavelength for the illumination of the iris and retina.

In general, both iris and retina illumination may use auto gain in order to correct for the proper exposure for correction of reflectance differences of the iris and retina. Alternatively, both iris and retina illumination bracketing (or exposure bracketing) may be used instead of auto gain. In this alternative approach, two or more illumination power settings are cycled through to bracket through all possible reflectance differences seen in the general population; for example: power setting 1 (pulse 1)=10 units, power setting 2 (pulse 2)=12 units, power setting 3 (pulse 3)=14 units, where cycle=pulse 1, pulse 2, pulse 3, pulse 1, pulse 2, pulse 3, . . . an so on. One could also do this by keeping the power constant and cycling three different pulse durations; for example: pulse duration 1 (pulse 1)=10 units, pulse duration 2 (pulse 2)=12 units, pulse duration 3 (pulse 3)=14 units, where cycle=pulse 1, pulse 2, pulse 3, pulse 1, pulse 2, pulse 3, . . . an so on.

Accordingly, in the embodiment shown in FIG. 1, the iris illumination can advantageously be pulsed at less than half the frame rate of the iris and retina cameras. The frame rates for both cameras are identical. The image of the iris is analyzed with the pupil tracking and iris focus measure digital processing algorithms. The $X_1$, $Y_1$, and $Z_1$ positions of the pupil of the iris are calculated. The user must move through the nominal $Z_N$ position of the system which establishes the absolute position of the user. Until that time, the system assumes a relative position of the pupil based on pupil size. Iris images that are adequately in focus are collected and analyzed appropriately. As described above, the LED's have three power settings that are cycled through (exposure bracketing) so as to accommodate for reflectance differences of the iris in the general population.

As described previously, the positional information of the pupil is utilized to select the addressable retinal illumination LED that will cleanly enter the pupil. The retina illumination LED is pulsed at half a frame out of phase from the iris illumination. The pulse duration is less than half the frame rate. As described above, by synchronizing the iris and retinal frame rates of the camera at half a frame rate out of phase with each other and using short pulses, the full frame rate of each camera can be utilized while minimizing noise that may occur between the illumination of the iris and the retina. Illumination pulses with shorter time frames freeze motion and increase image quality.

The present invention may also employ a retina auto focus mechanism, which corrects for changes in retinal focus due to differences in uncorrected dioptric power and allows any corrective optical devices to be removed by the user. Corrective optical devices can cause aberrations and glare. Several techniques may be applied to achieve retina auto focus.

Figure 2C:
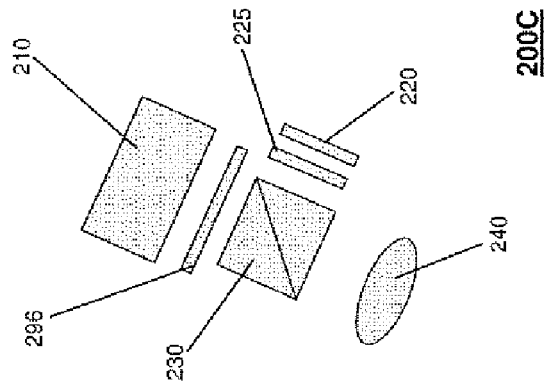
FIG. 2C illustrates yet another retina auto-focus technique employed by an embodiment of the present invention.
Figure 2B:
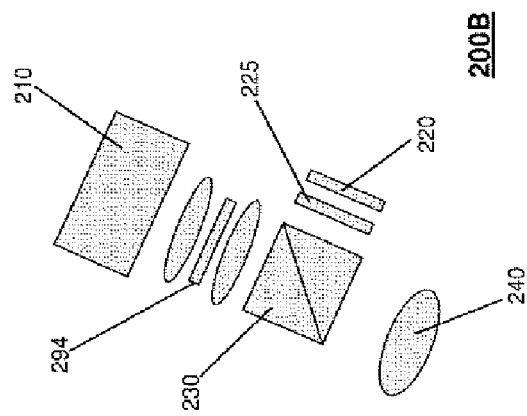
FIG. 2B illustrates another retina auto-focus technique employed by an embodiment of the present invention.
Figure 2A:
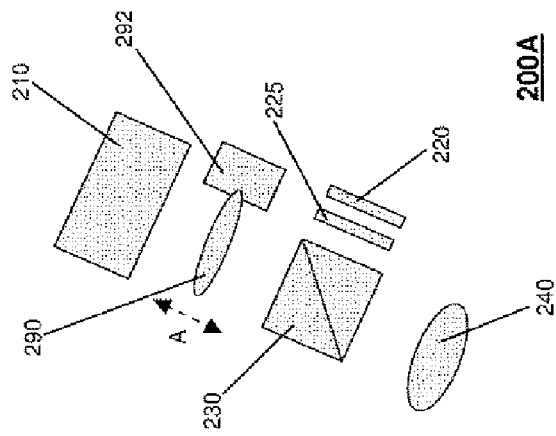
FIG. 2A illustrates a retina auto-focus technique employed by an embodiment of the present invention.

As shown in the retina imaging system 200 of FIG. 2A, one technique for retina auto focus employs a motor 292 that moves the focus of the retina imaging lens 290 in specific dioptric value increments, along the arrow A as shown in FIG. 2A. The system utilizes a retina focus measure algorithm comparing successive positions. If the system remains out of focus, the system uses this comparison to determine the direction in which it should move.

As shown in FIG. 2B, another technique for retina auto focus employs wavefront coding technology using cubic phase plate and signal analysis. FIG. 2B illustrates a retina imaging system 200B with an imaging lens with a cubic phase plate, indicated by reference numeral 294. Contrary to the use of the motorized lens, there are no moving parts with wavefront coding. A cubic phase mask is placed in the system and the system is fully characterized with regard to dioptric power correction. Differences in dioptric power correction are calculated and specific digital filters are created for each dioptric power. When an image is taken, each of the filters is convolved with the image and the one with the highest contrast image is utilized. This configuration provides a robust system, which can be used at extreme temperatures, because there are no moving parts.

As depicted in the retina imaging system 200C of FIG. 2C, a third technique for retina auto focus uses an electroactive optical element 296, which is a liquid crystal sandwiched between two pieces of glass with a specific electrode configuration on them. By activating the electrodes with different voltages, either a positive or negative dioptric correction may be created. This can be a single device or a stack of devices to create larger dioptric correction.

While the auto focus systems above have been described in terms of retina imaging, it is understood that such auto focus techniques are also applicable to an iris auto focus system.

In general operation, the multimodal ocular biometric system according to the present invention may be handheld, but may also be attached to an articulating arm, attached to or embedded into an immovable object such as a wall, or adapted to an existing optical system such as a rifle scope or tank periscope. As described further below, the system may possess a simple fixation system, or interface, to position the user. For instance, with an exemplary handheld embodiment, the user picks up the device and removes any eyeglasses the user may be wearing. The user then identifies a fixation illumination source within the device and carefully positions the device with respect to his or her face according to the fixation illumination source. As also described in another embodiment below, the outer housing of the device may be designed to help center the user as well as to provide light baffling of external ambient light.

With reference to FIG. 1, the user operates the image capture device 12 by identifying the fixation light source 310 through the broadband antireflection coated windows 330. The light from the source 310 reflects off the beamsplitter and cold mirror 320. In a fixation system 60 illustrated in FIG. 7, a circular target 62 with cross hairs 64 is viewed through an imaging lens with two illuminated bars 66 above and below the lens. The illuminated bars 66 are positioned at the exit pupil of the device 12. The bars 66 may include a diffusing light guide with colored LEDs illuminating them. The circular target 62 is a reticule with a diffuser and colored LEDs behind it. The user operates the fixation system 60 by moving the device 12 relative to his or her eyes to center the circle 62 between the two bars 64. As the user moves back and forth relative to the device 12, different colored combinations may help guide his or her movement.

The image capture device 12 may also employ provide positional feedback to the user by using the pupil tracking and iris focus measure digital processing algorithms. A retina focus measure digital processing algorithm can be used in place of, or in combination with, an iris focus measure digital processing algorithm.

In another fixation system 70 illustrated in FIGS. 8A-C, an interface provides a set of central cross hairs 72 designating nominal positioning ($X_N$, $Y_N$, $Z_N$) for optimal alignment by the user relative to the device 12 and a second set of cross hairs 74 with a circle 76 designating the user's present position ($X_1$, $Y_1$, $Z_1$). When the user moves along the X- and Y-axes (left, right, up and down as shown in FIGS. 8A-C), the cross hairs 74 with the circle 76 correspondingly move along the X- and Y-axes. When the user moves back and forth relative to the device along the Z-axis the diameter of the circle 76 becomes larger as the user moves away from the nominal $Z_N$ position and smaller as the user moves towards the nominal $Z_N$ position. When the circle 76 disappears, the user is positioned at the nominal $Z_N$ position. Furthermore, when the user sees only a single set of cross hairs, the second set of cross hairs 74 overlaps with the central cross hairs 72. Therefore, the image of FIG. 8A indicates that the user is misaligned along the X-, Y-, and Z-axes. Meanwhile, the image of FIG. 8B indicates that the user is aligned along the X- and Y-axes, but misaligned along the Z-axis. When the interface shows the image of FIG. 8C, the user has achieved the nominal position ($X_N$, $Y_N$, $Z_N$). Auditory feedback may be additionally employed with the fixation system 70, signaling the user with appropriate tones and/or verbal instructions to move the user into optimal alignment.

Figure 9:
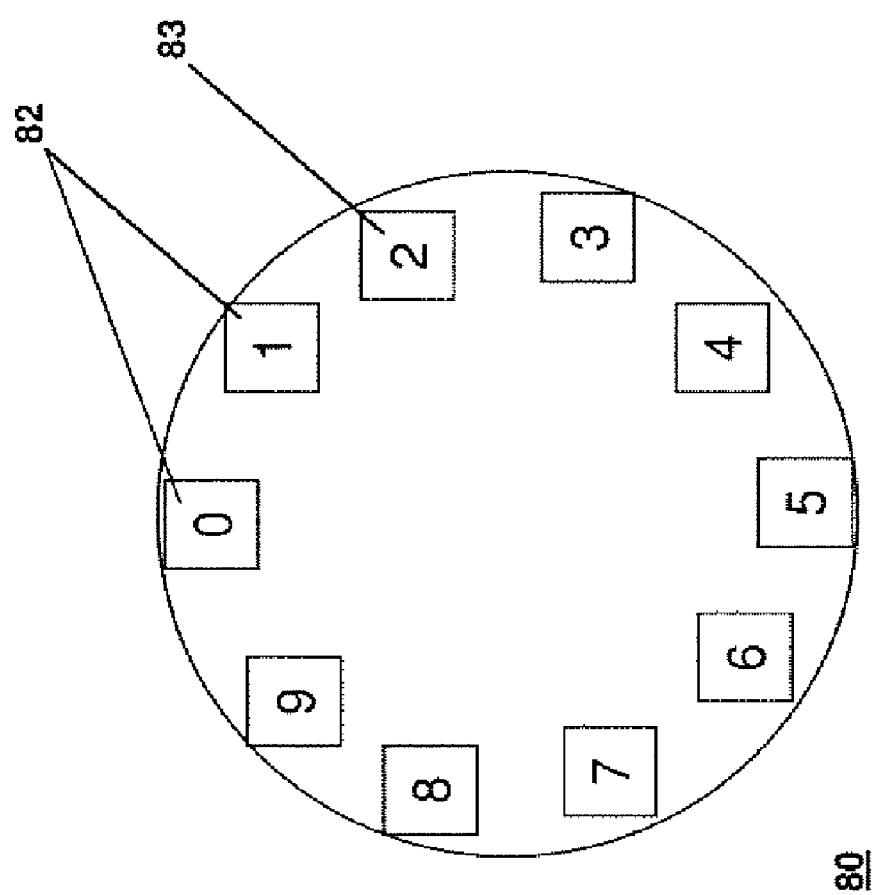
FIG. 9 illustrates an exemplary scheme for entering a personal identification number by pupil tracking.

As shown in FIG. 9, embodiments of the present invention may include, in combination with the fixation system, a clock interface 80 that accepts a pin number for further identification. When users look into the device, they begin by looking at a start position. They then enter their pin number by fixating on the numbers or other symbols 82. The system uses the pupil tracking to determine the trajectory of the different pupil positions to identify each number or symbol 82 entered by the user. Verification of each number or symbol 82 can be indicated through aural tones and/or visible color changes, as illustrated by number 83 in FIG. 9.

In addition to the two-eye simultaneous iris/retina combination system shown in FIG. 1, other configurations can be employed to combine iris and retina images. A left-eye only configuration employs iris and retina imaging systems to capture images of the left eye only. Similarly, a right-eye only configuration employs iris and retina imaging systems to capture images of the right eye only.

Figure 3:
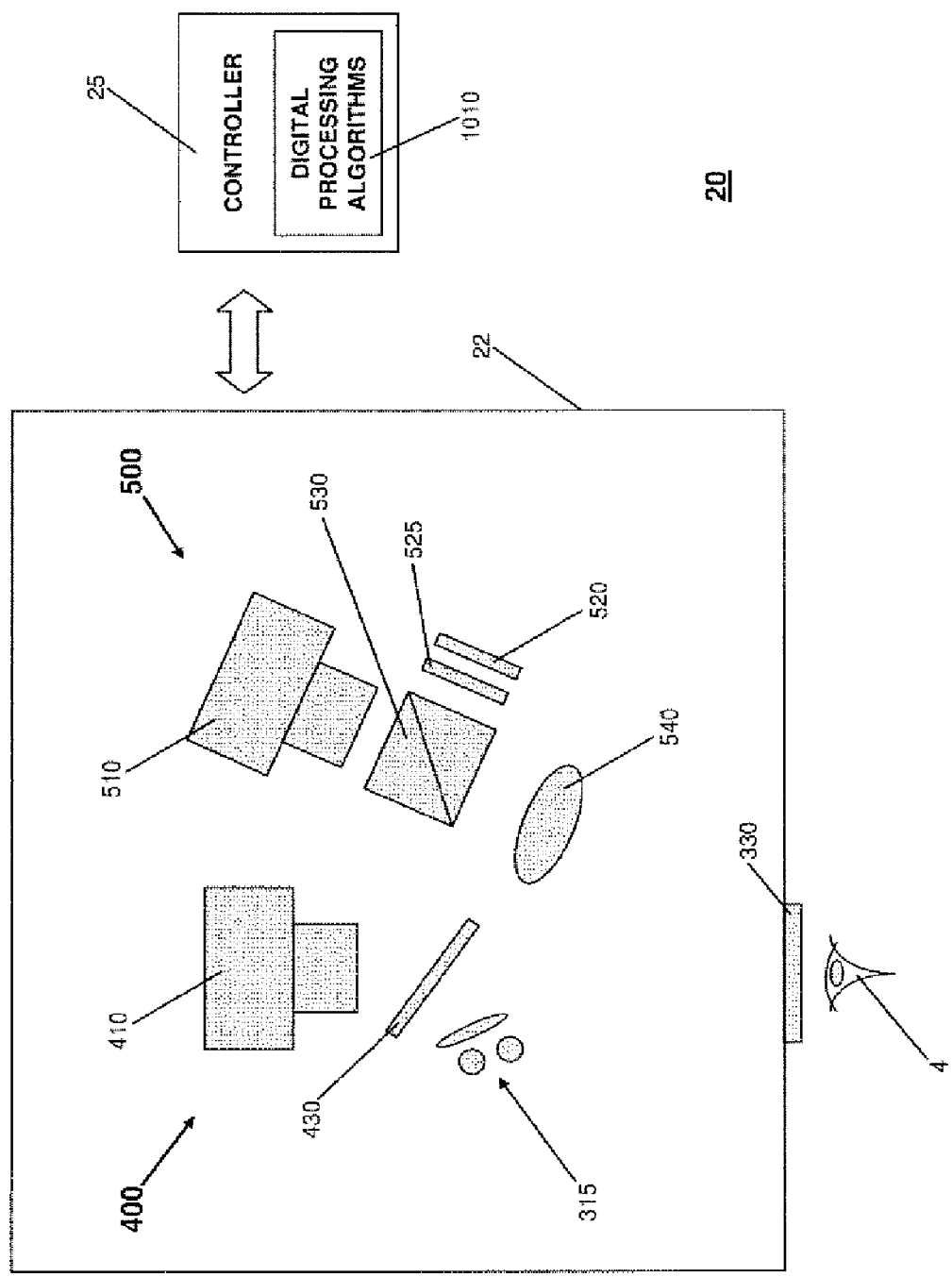
FIG. 3 illustrates an embodiment of the present invention with a dual-sensor, two-eye flippable configuration.

As shown in FIG. 3, a dual sensor, two-eye "flippable" system 20 provides one iris imaging system 400 and one retina imaging system 500 in an image capture device 22 that can be oriented to capture images of both the left and right eyes, in succession. In particular, the same iris imaging system 400 and retina imaging system 500 are used to capture images of the left and right eyes. Once images of one eye are captured, the user flips, or turns the device over, to capture images of the second eye. Flipping the device over maintains the correct orientation of the iris and retina imaging systems with respect to the eye. For example, the specific orientation shown in FIG. 2 permits the capture of images from the right eye 4.

Similar to the iris imaging system 100 described previously, the iris imaging system 400 in FIG. 3 employs a camera sensor 410 which captures images of the illuminated iris through a dichroic beamsplitter 430. Similar to the retina imaging system 200 described previously, the retina imaging system 500 in FIG. 3 employs an illumination source 520 that provides light that is guided through a LCD shutter/diffuser/micro-optics 525, a polarizing beamsplitter (PBS) 530, and an aspheric objective lens 540 to the retina. Furthermore, the image of the retina then passes back through the aspheric objective lens 540 and the PBS 530 to the camera sensor 510. The system 20, however, employs a dual fixation LED with orientation sensor 525, where one of the two LED's is activated according to the "flipped" orientation of the device 22. An orientation sensor senses the orientation of the device 22 and correspondingly turns on the appropriate fixation LED.

Moreover, the system 20 as shown in FIG. 3 also uses a dual retina/iris illumination and retina illumination tracking configuration. In other words, the illumination source 520 provides illumination of the iris as well as the retina. The retina illumination system in this embodiment is similar to the illumination system for the retina in the two-eye simultaneous system 10 shown in FIG. 1, where the element of the LED array is illuminated according to the pupil's position in space. The captured iris image is used to track the position of the pupil in order to identify the specific LED that should be used to provide the necessary pinpoint illumination of the retina in the subsequent image capture. Here, however, both the retina illumination and iris illumination emanate through the retina imaging optics. The addressable light source array 520 is used to create pulsed light for both iris and retina illumination. All elements in the array 520 are employed to illuminate the iris. Then, using the pupil tracking digital processing algorithm and iris focus measure digital processing algorithm, selected elements in the array are turned on to illuminate the retina. As the position of the iris moves the appropriate elements in the array are selected for both the retina and iris. For the retina illumination, the illumination elements of the array imaged (to just before the retina) are smaller than the pupil of the iris. Advantageously, this illumination configuration enables simplification of the packaging, minimizes reflections off the orbit of the eye for uniform iris illumination, and allows scanning of the retina for increased volume of alignment. As described above, the addressable light source array can be built in several different configurations, including, but not limited to, the use of an LED array with light guides and diffuser and an LCD shutter, scanning micro-optics, and holographic elements, as indicated by reference numeral 525.

Figure 4:
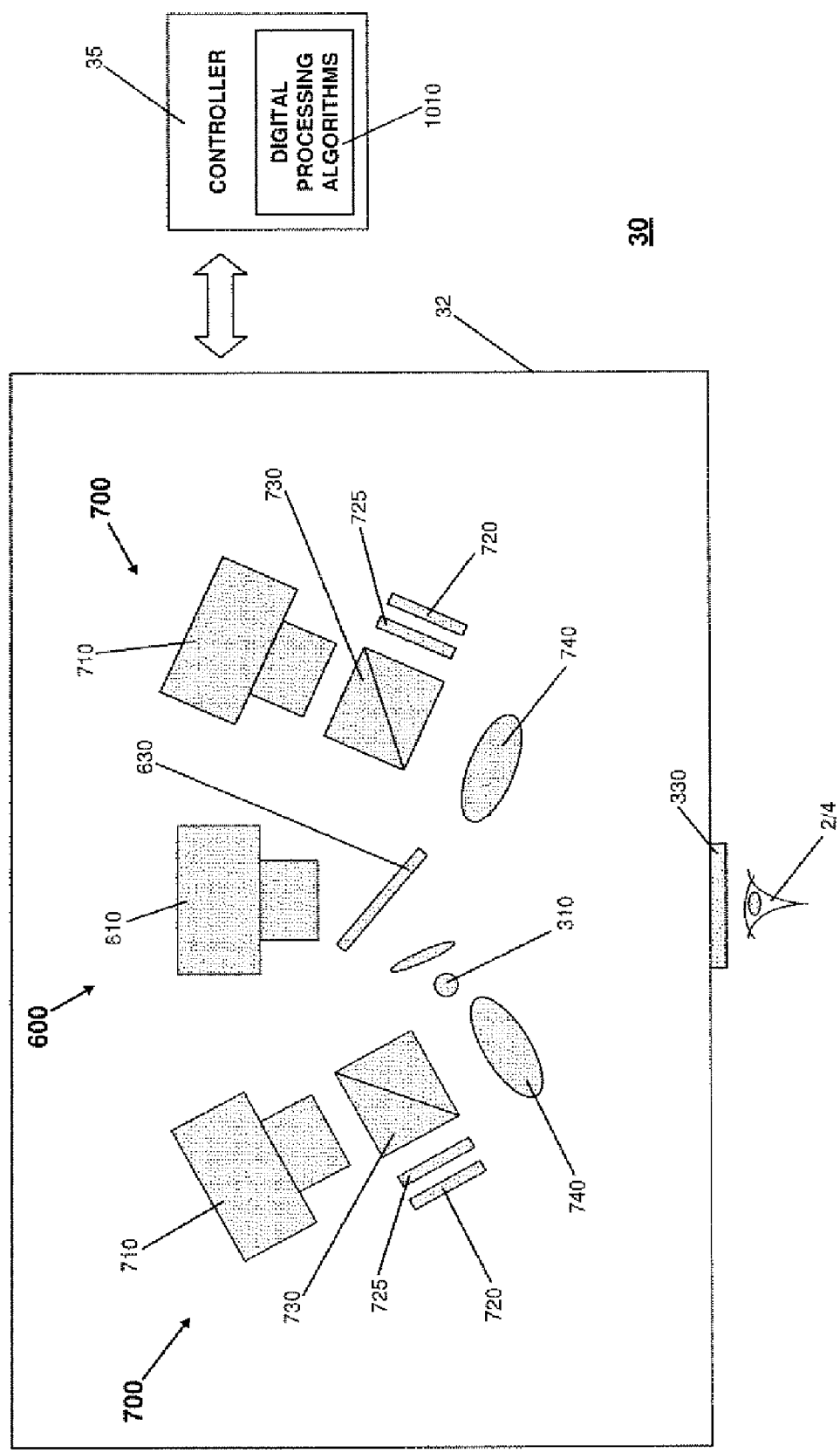
FIG. 4 illustrates an embodiment of the present invention with a triple-sensor, two-eye sequential configuration.

In another embodiment illustrated in FIG. 4, a triple sensor, two-eye sequential system 30 employs one iris imaging system 600 and two retina imaging systems 700 in device 32 to capture sequential, or successive, images of both the left and right eyes. The same iris imaging system 600 is used to image the iris of both the left and right eyes, while two retina imaging systems 700 with specific left and right orientations are used to image the left and right eyes, respectively. Unlike the two-eye flippable system 20, the system 30 of FIG. 4 does not have to be flipped, or turned over, to capture images of the second eye. Thus, it easier to reposition for capture of images from the second eye, because the same horizontal plane can be maintained. In addition, a dual fixation LED with orientation sensor does not have to be employed. Rather, a single fixation source 310 may be employed.

Similar to the iris imaging system 100 described previously, the iris imaging system 600 in FIG. 4 employs a camera sensor 610 which captures images of the illuminated iris through a dichroic beamsplitter 630. Similar to the retina imaging system 200 described previously, the retina imaging system 700 in FIG. 4 employs an illumination source 720 that provides light that is guided through a LCD shutter/diffuser/micro-optics 725, a polarizing beamsplitter (PBS) 730, and an aspheric objective lens 740 to the retina. Furthermore, the image of the retina then passes back through the aspheric objective lens 740 and the PBS 730 to the camera sensor 710.

Figure 5:
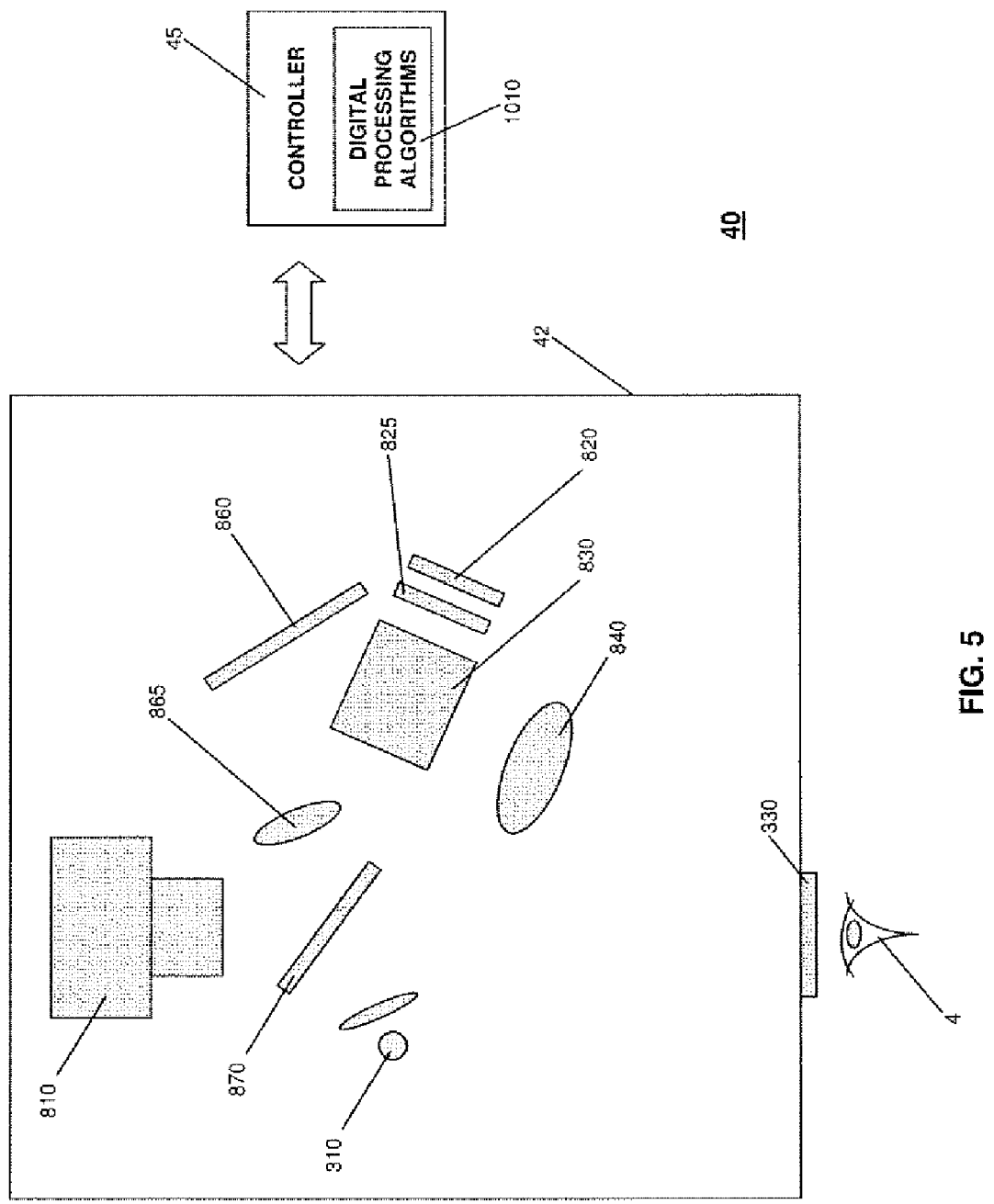
FIG. 5 illustrates an embodiment of the present invention with a single-sensor, two-eye sequential configuration.

In yet another embodiment shown in FIG. 5, a single-sensor, two-eye sequential system 40 includes a single sensor 810 in device 42 to capture both the retina and iris images by employing pulse separation and different wavelengths for the iris and retina. Wavelength multiplexing can be implemented with this embodiment, where a single optic with two surfaces with different coatings permits the capture of different images corresponding to particular wavelengths. For instance, $\lambda_1=810$ nm and $\lambda_3=880$ nm can be used to capture images of the iris, while $\lambda_2=850$ nm and $\lambda_4=910$ nm can be used to capture images of the retina. The two coated surfaces on the single optic permit sequential detection of $\lambda_1$, $\lambda_2$, $\lambda_3$, and $\lambda_4$ and capture of alternating images of the iris and retina. In general, several optical systems can be used to get the images of both eyes on a single detector array. Like the systems described above, the system 40 shown in FIG. 5 employs an LED array 820, a LCD shutter/micro-optics/diffuser 825, a polarizing beamsplitter (PBS) 830, an aspheric objective lens 840, and a single fixation source 310. However, a compensating lens 865, an extra reflective mirror 860, and a dichroic beamsplitter 870 are additionally used in order to form images of the retina and the iris on the same camera sensor 810. The compensation lens allows for proper image magnification for the capture of the iris by camera sensor 810. Moreover, similar to the system 20 of FIG. 3, the system 40 uses a dual retina/iris illumination and retina illumination tracking configuration. The advantage of this system is that it uses a single sensor and fewer parts. However, the disadvantage is that the system runs at half the frame rate for iris and retina image capture being every other frame respectively. In other words, halving the frame rate yields half the number of images of the retina and the iris, so it may be more difficult to obtain adequate images. In addition, this particular configuration must also be flipped like the dual sensor, two-eye flippable configuration shown in FIG. 2.

When the retina illumination tracking system described above is used with symmetric iris/retina camera combinations to allow simultaneous capture of both eyes, such as the two-eye simultaneous system 10 of FIG. 1, one achieves automatic interpupillary adjustment without the need for any moving parts. Interpupillary distance measurement can be determined, providing an additional biometric. With information regarding position along the X- and Y-axes from the pupil tracking algorithm and information regarding position along the Z-axis from the focus measure algorithm, the (X, Y, Z) position of each pupil can be used to calculate pupil separation. As described above, this particular biometric is used to reduce database searching for iris matching, retina matching and iris retina fusion matching. Additional on axis illumination of the iris can also enable bright pupil back reflection ("red eye") that can enhance the iris/retina tracking algorithms.

While all the embodiments above capture and process a combination of iris and retina images, other embodiments of the present invention may capture and process either images of the iris or the retina from both eyes of a subject. As described previously, biometrics based on data from both eyes are more accurate and robust than using biometrics that include data from only the iris or only the retina from a single eye. Illustrating a corresponding exemplary embodiment, FIGS. 6A-D show a device 50 adapted to simultaneously accommodate both eyes of a user, similar to a pair of binoculars, and capture images of both irises. As shown in FIGS. 6A-D, the user employing the device 50 is able to see through the device 50 to view an object external to the device 50 as a target. In particular, with the device positioned at the user's right and left eyes, the user looks into the user windows 902 and through opposing windows 904 to view the external object, or target, on the other side of the device 50. Unlike the embodiments described previously, the device 50 may be employed without a fixation illumination source. The device 50 employs a fixation system where the exit pupil matches or is slightly larger than the entrance pupil of the eye for a given eye relief. Using a two-eyed simultaneous configuration accommodating both eyes, an elliptical, or near elliptical, exit pupil is used to accommodate interpupillary distance. This maintains vertical alignment and allows vergence by the user to maintain horizontal alignment. The target may be an image which appears to be at a distance. Advantageously, this causes the brain to allow the eye to relax to its unaccommodated state.

Figure 6A:
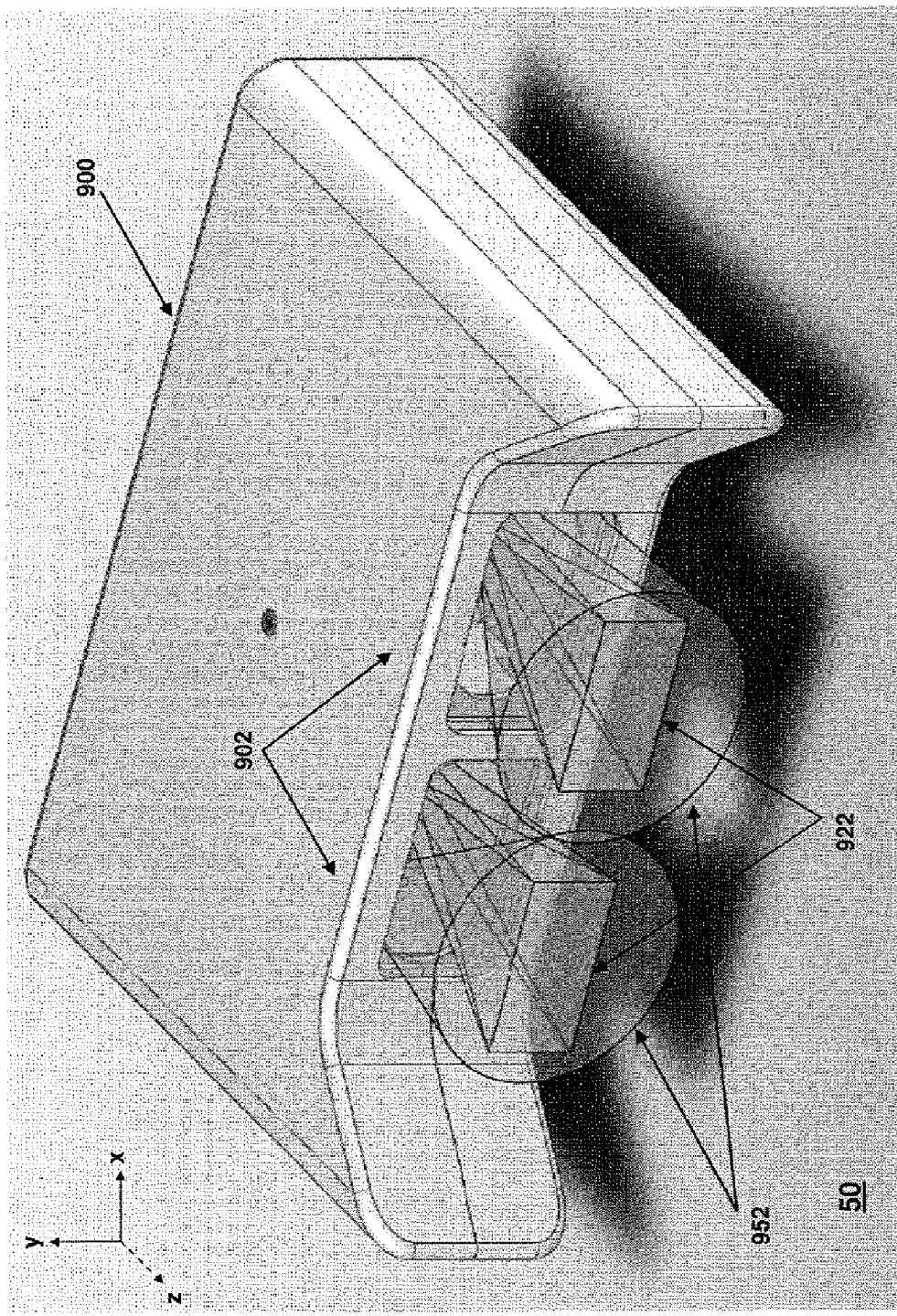
FIG. 6A illustrates an external view of an embodiment of the present invention that captures iris images from both eyes.
Figure 6B:
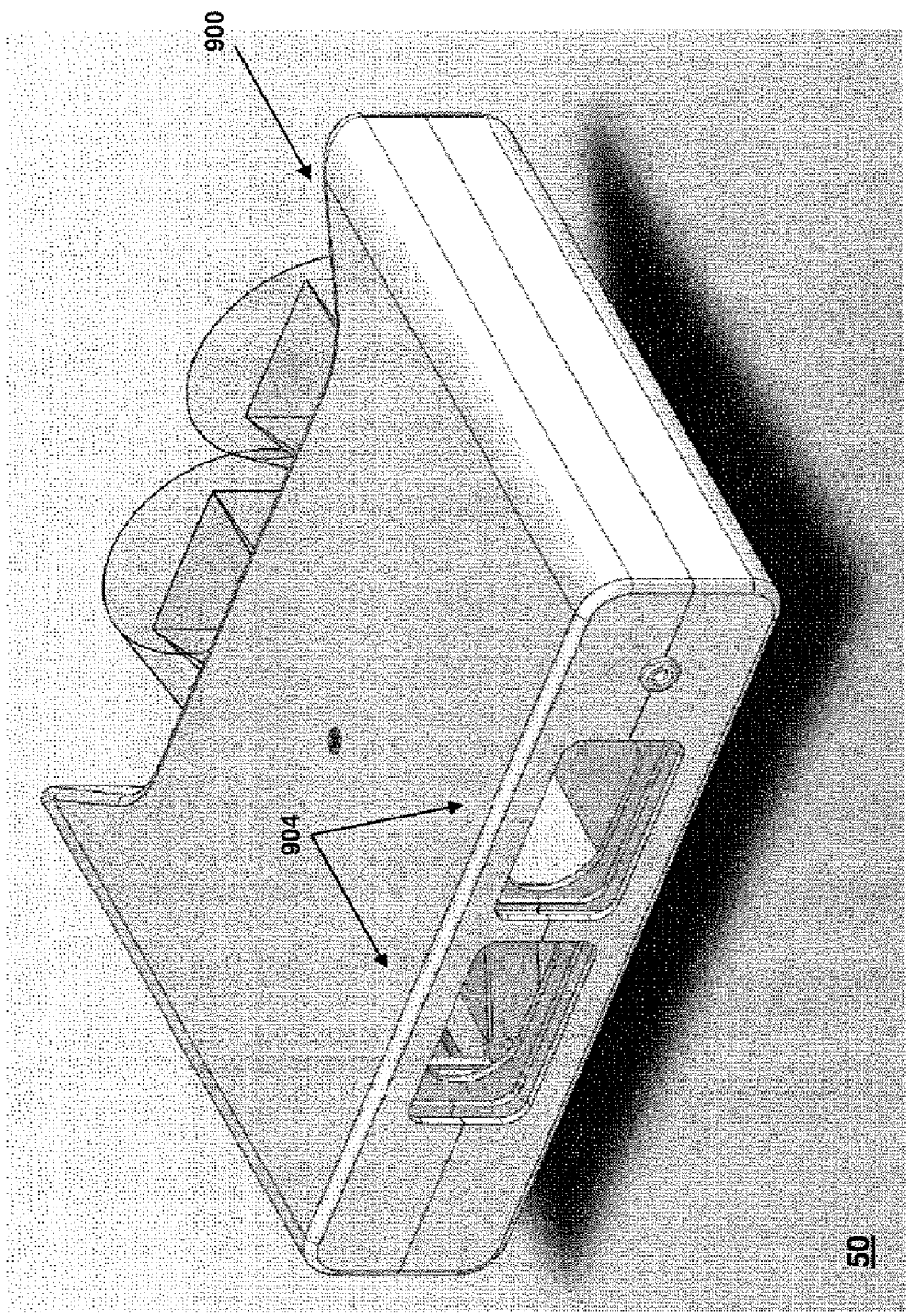
FIG. 6B illustrates another external view of the embodiment of FIG. 6A.

In particular, FIG. 6A shows the biometric device 50 with housing 900. In general, users begin by looking through the user windows 902 and bringing the device 50 closer to their eyes until they are able to use their vergence to visually fuse the exit pupils of the device 50. This approach aligns most users to a given image plane with or without eyeglasses. As shown in FIG. 6B, the device 50 also has opposing windows 904 facing the opposing user windows 902. The opposing windows 904 not only permit an image of the target on the other side of the device 50 to be seen by the user, but the opposing windows also allow one to see the eyes of the user positioned at user windows 902. As a result, in addition to operation of the device 50 directly by the user, the device 50 also permits operation by another person who holds the device 50 at the user's face and aligns it to the user's eyes from the other side. Thus, the device 50 allows an operator to assist a user during alignment and operation of the device 50.

With its binocular-like shape, the device 50 helps to ensure proper alignment about at least two axes of rotation in order to achieve a better biometric. With reference to the X-, Y-, and Z-axes shown in FIG. 6A, when users bring the device 50 to their face, they have to position the device 50 so that they can see through both user windows 902, thus ensuring proper alignment about the Z-axis. Moreover, in order to look into the device 50 more easily, users naturally position the device 50 so that the user windows 902 are approximately the same distance from each respective eye, which ensures proper alignment about the Y-axis. As described above, the exit pupils can then be elliptical, or slit-like, to minimize any misalignment about the X-axis.

Additionally, to obtain more precise alignment of the user's eyes, a linear horizontal diffraction grating, or equivalent "microlouver" technology, may be placed on user windows 902 in order to limit the field of view of the user or operator and ensure proper alignment along the vertical Y-axis. A second vertical diffraction grating may also be employed to also ensure proper alignment along the horizontal X-axis. The combination of horizontal and vertical gratings limits the field of view vertically and horizontally. Moreover, a semitransparent target may be placed behind the gratings for additional alignment indicators.

Figure 6C:
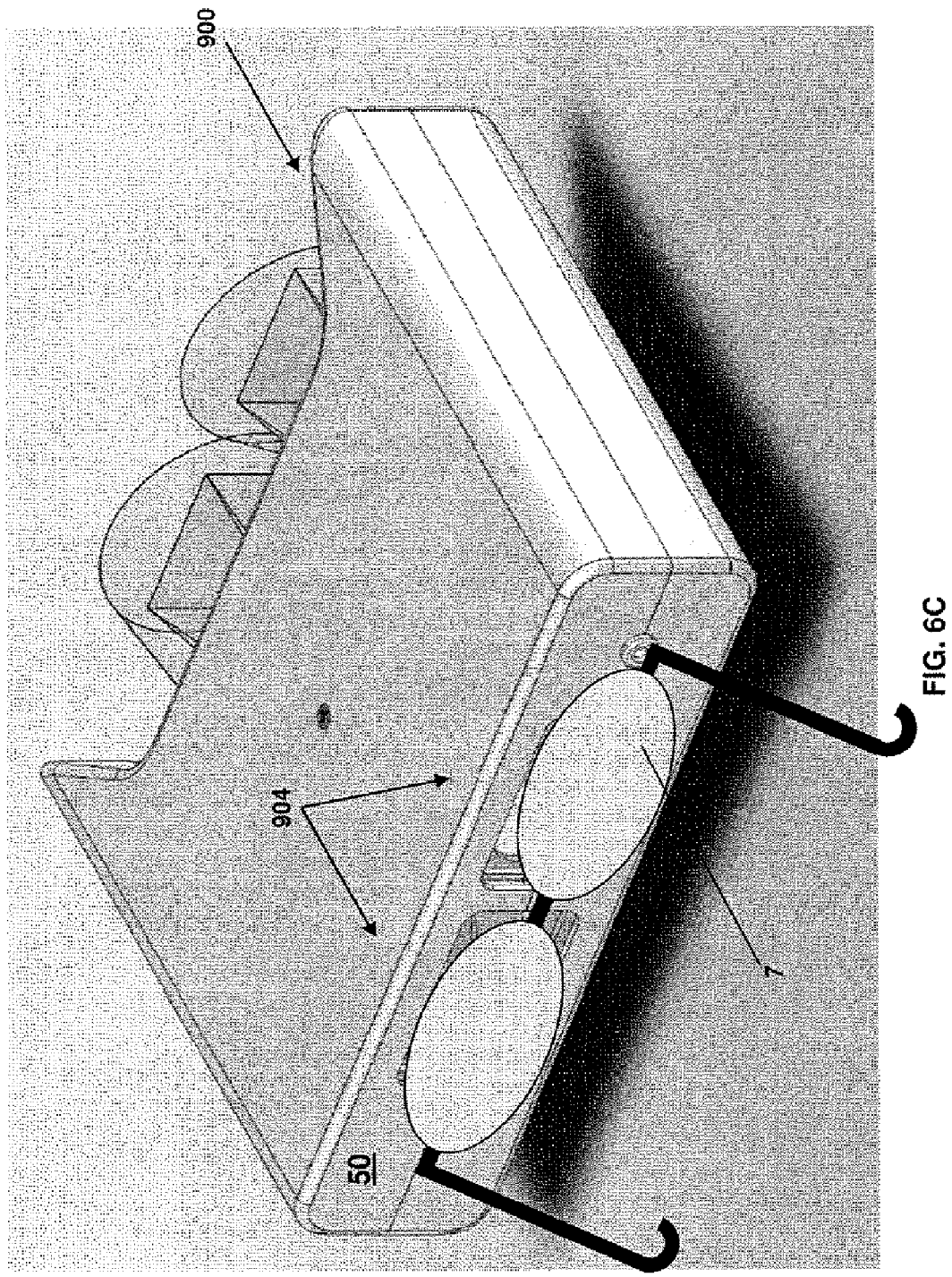
FIG. 6C illustrates the use of corrective eyewear with the embodiment of FIG. 6A.
Figure 6D:
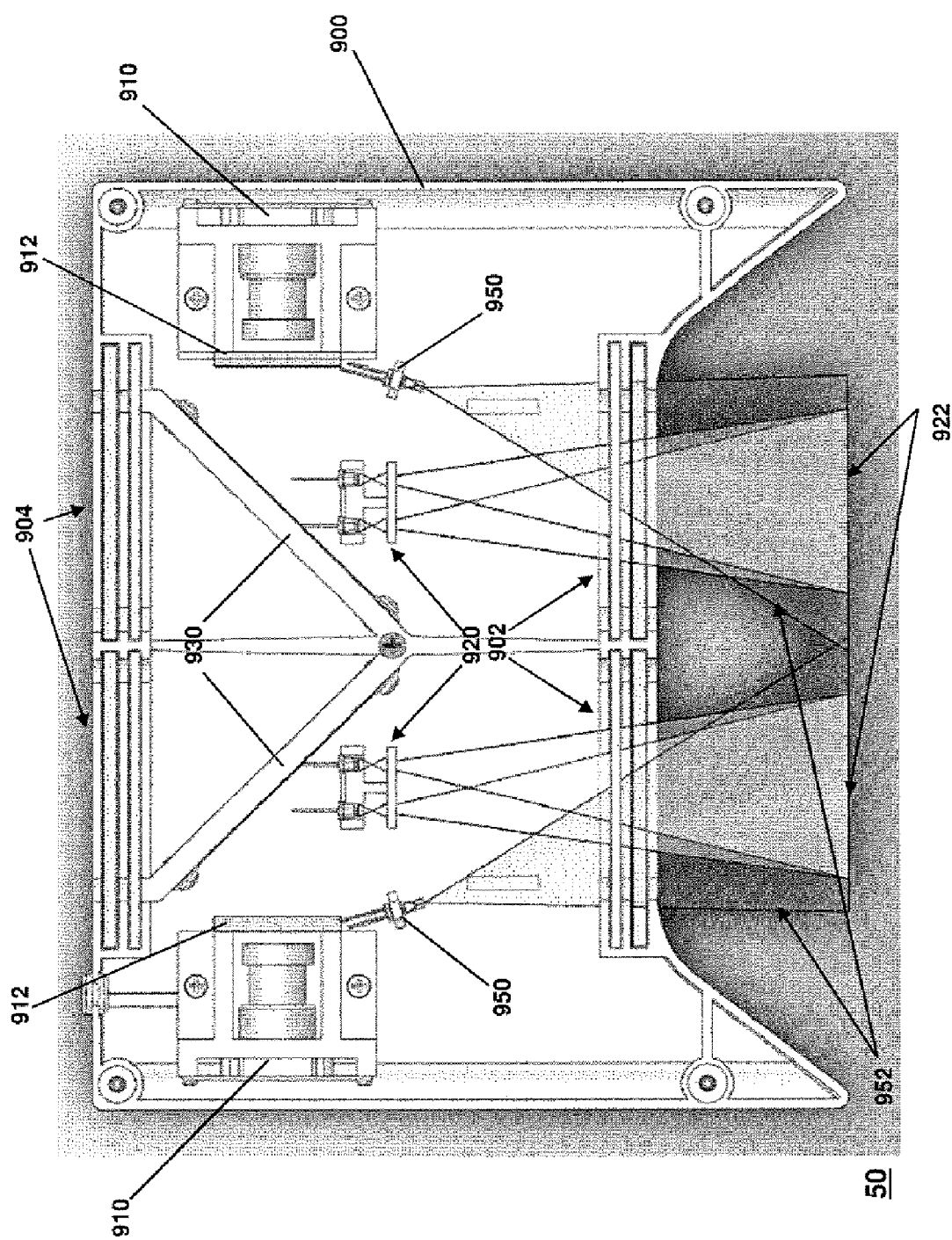
FIG. 6D illustrates an internal view of the embodiment of FIG. 6A.

FIG. 6D illustrates an arrangement of components that may be employed by device 50 to capture images of the irises of both eyes positioned at user windows 902. Two camera sensors 910 with filters 912 are positioned on opposite (right and left) sides in the interior of the device 50 to capture respective images of the right and left eyes. The LEDs 920 provide near infrared illumination to the iris of each eye. The illumination is reflected from the irises back to the respective beamsplitters 930. The beamsplitters 930 may be "hot" mirrors which redirect the near infrared light reflected from the irises to the respective camera sensors 910, but which allow visible light to pass through to the operator windows 904 so that an operator can see the user's eyes. White light illumination from the white light illumination sources 950 may be employed to close down the pupil of the user to provide better biometric data and to help illuminate the eye for alignment by an operator. As shown in FIGS. 6A and 6D, the area 922 of near infrared light cast by the LEDs 920 is smaller than area 952 of white light cast by sources 950. With a smaller area 922, the amount of near infrared light reflected from the area outside the iris, such as the user's cheeks, is minimized.

To facilitate the use of the device 50 by an individual who requires corrective eyeglasses, the device 50 may accommodate the individual's eyeglasses 7, as illustrated in FIG. 6C. For instance, the individual's eyeglasses 7 may be combined with the device 50 beyond the beamsplitters 930 but in a position where the eyeglasses can sufficiently correct the person's vision in order to use the device 50 and view the external object. Accordingly, illumination and image capture are not affected by the eyeglasses.

It is understood that a device similar to the device 50 illustrated in FIGS. 6A-D may be used to capture images of the retina from both eyes. Of course, another similar device may be employed to capture images of both the iris and the retina of both eyes, in a manner similar to embodiments described previously.

As described previously, various algorithms may be employed to process the data captured by the multimodal ocular devices described herein. For example, the device 50 may employ the digital processing algorithms 1010 illustrated in FIG. 10 to process and evaluate iris image data. As described with respect to various embodiments herein, such digital algorithms 1010 may include a pupil segmentation algorithm 1011 for determining a pupil image in the captured image, an iris segmentation algorithm 1012 for determining an iris image in the captured image, an eyelid/eyelash segmentation algorithm 1013 for determining an eyelid/eyelash image in the captured image, and an algorithm 1014 for measuring the focus on the iris. Moreover, device 50 may employ an auto-capture process which employs employ any of digital algorithms 1010, in part, to evaluate captured images and obtain the best possible images for biometric identification, for example, as described with reference to FIGS. 21 and 22.

In some embodiments, a plurality of processing threads may process the plural sets of image data corresponding to the multiple modes of the devices. For example, in a two-iris device, two iris processing threads may run in parallel. In a retina/iris device, an iris thread runs in parallel to a retina processing thread. In one particular embodiment, the controlling software waits for all processing threads to provide a "successfully acquired" signal. Preferably, each thread continues processing until all threads have provided a "successfully acquired" signal. Therefore, with reference to FIG. 21, when a process reaches step 1490 but other threads have not yet provided a "successfully acquired" signal, then the process loops back to step 1420. On the other hand, if multiple processing threads are in progress and a timeout is signaled in step 1480, the timeout halts all threads whereby each thread finishes processing the current frame and all then return a "successfully acquired" or "failed to acquire" signal based on whether the number of image frames in the cache is greater than or less than a number O.

The present invention may include time linking of image frames across different threads. This may be achieved through the sequential indexing of frames as read from different cameras or though timing stamping image frames using the PC clock.

As described above with reference to FIG. 1, the controller 15 may be a programmable processing device, such as an external conventional computer networked with the device 12 or an on-board field programmable gate array (FPGA) or digital signal processor (DSP), that executes software, or stored instructions. Controllers 25, 35, and 45 shown in FIGS. 3, 4, and 5, respectively, may be similarly configured. In general, physical processors and/or machines employed by embodiments of the present invention for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments of the present invention, as is appreciated by those skilled in the computer and software arts. The physical processors and/or machines may be externally networked with the image capture device, or may be integrated to reside within the image capture device. Appropriate software can be readily prepared by programmers of ordinary skill based on the teachings of the exemplary embodiments, as is appreciated by those skilled in the software art. In addition, the devices and subsystems of the exemplary embodiments can be implemented by the preparation of application-specific integrated circuits or by interconnecting an appropriate network of conventional component circuits, as is appreciated by those skilled in the electrical art(s). Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present inventions can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present invention has been described in connection with a number of exemplary embodiments, and implementations, the present inventions are not so limited, but rather cover various modifications, and equivalent arrangements, which fall within the purview of prospective claims. For example, the positions of the iris camera and the fixation illumination source in embodiments above may be switched by the use of a "hot" mirror which reflects the iris image. Similarly, the positions of the retina camera and the retina illumination may be switched by illuminating the retina with P polarized light and imaging the S polarized light.

As a further example, while embodiments may capture retina images from both eyes, only the best retinal image from both eyes may be retained to ensure useable retinal biometric data. As a result, for a two-eye simultaneous configuration, the embodiment produces data regarding the pupillary distance as well as biometric data from both irises and one of the two retina.

Moreover, although the exemplary embodiments discussed herein are combination retina and iris imaging systems used for human identification, the multimodal ocular biometric system of the present invention is not limited to human identification and can be used for animal identification.

What is claimed is:

1. A method for segmenting a biometric characteristic from an eye image captured by a biometric device, the method comprising the steps of:

defining one or more first search windows in a captured eye image;

identifying a first set of points corresponding to peaks in an image intensity gradient in each of the one or more first search windows;

determining, from the first set of points, segments according to image intensity transitions, each segment having a center point;

determining a position for the center point of each segment;

grouping sets of the segments into a first set of clusters according to an analysis of the positions of the center points for the segments; and selecting, from the first set of clusters, a second set of clusters corresponding to a pupil image;

fitting a first model template to the points for each set of segments corresponding to the second set of clusters, the fitted first model template corresponding to an initial pupil outer boundary for the pupil image;

defining one or more second search windows in relation to the initial pupil outer boundary;

identifying a second set of points corresponding to peaks in an image intensity gradient in each of the one or more second search windows; and fitting a second model template to the second set of points, the fitted second model template corresponding to a refined pupil outer boundary for the pupil image.

2. The method according to claim 1, wherein the first model template and the second model template are circles.

3. The method according to claim 1, wherein the one or more first search windows are rectangular search windows extending horizontally across the eye image.

4. The method according to claim 1, wherein the one or more second search windows are rectangular search windows with longitudinal axes extending perpendicularly to the initial pupil outer boundary.

5. The method according to claim 1, wherein the image intensity transitions comprise a light-to-dark transition on a first side and a dark-to-light transition on a second side.

6. The method according to claim 1, wherein the step of selecting a second set of clusters comprises the steps of selecting, from the first set of clusters, corresponding to a shape feature.

7. The method according to claim 6, wherein the step of selecting a second set of clusters further comprises applying a weighting score to each cluster in the first set of clusters according to pupil-related scoring criteria and sorting the first set of clusters according to the weighting scores.

8. The method according claim 1, further comprising:

defining one or more third search windows in relation to the pupil image;

identifying a third set of points corresponding to image intensity transitions on a right side of the pupil image and to a left side of the pupil image, the third set of points corresponding to edge points;

fitting a third model template to the third set of points, the fitted third model template corresponding to an initial iris outer boundary for the iris image;

defining one or more fourth search windows in relation to the initial iris outer boundary for the iris image;

identifying a fourth set of points corresponding to peaks in an image intensity gradient in each of the one or more fourth search windows; and fitting a fourth model template to the fourth set of points, the fitted fourth model template corresponding to a refined iris outer boundary for the iris image, wherein the refined pupil outer boundary of the pupil image corresponds with an iris inner boundary of the iris image.

9. The method according to claim 8, wherein the third set of points comprises two edge points.

10. The method according to claim 8, wherein the third model template and the fourth model template are circles.

11. The method according to claim 8, wherein the one or more third search windows are rectangular search windows with longitudinal axes which start at a center of the pupil image and extend downwardly at an angle from a horizontal line of the eye image.

12. The method according to claim 8, wherein the one or more fourth search windows are rectangular search windows with a longitudinal axis extending perpendicularly to the initial iris outer boundary.

13. The method according to the claim 8, further comprising identifying an annular region corresponding to the iris image, the annular region being defined by the refined iris outer boundary for the iris image and the refined iris inner boundary for the iris image.

14. The method according to claim 13, further comprising computing an amount of occlusion of the iris image.

* * * * *

UNITED STATES PATENT AND TRADEMARK OFFICE
CERTIFICATE OF CORRECTION

PATENT NO.       : 8,170,293 B2                                   Page 1 of 1
APPLICATION NO.  : 11/898190
DATED            : May 1, 2012
INVENTOR(S)      : Yasunari Tosa et al.

It is certified that error appears in the above-identified patent and that said Letters Patent is hereby corrected as shown below:

Title page at (75) Inventors, Line 3:
Replace "Nichoas A. Accomando, Hingham, MA" with "Nicholas A. Accomando, Hingham, MA"

Signed and Sealed this
Twenty-fourth Day of July, 2012

David J. Kappos
*Director of the United States Patent and Trademark Office*